US010949052B2

(12) United States Patent
Carrigan et al.

(10) Patent No.: US 10,949,052 B2
(45) Date of Patent: Mar. 16, 2021

(54) SOCIAL INTERACTION IN A MEDIA STREAMING SERVICE

(71) Applicant: Apple Inc., Cupertino, CA (US)

(72) Inventors: Taylor G. Carrigan, San Francisco, CA (US); Shaun C. Lind, San Francisco, CA (US); Ofer Morag, Oakland, CA (US); Monika E. Gromek, Oakland, CA (US); William Martin Bachman, San Jose, CA (US); Jeffrey L. Robbin, Los Altos, CA (US); Thomas Alsina, Mountain View, CA (US); Justin G. Wismer, Portola Valley, CA (US); Ryan D. Walsh, San Francisco, CA (US); Steve S. Gedikian, Redwood City, CA (US); Michael Trent Reznor, Beverly Hills, CA (US); Brendon E. Manwaring, Fairfield, CT (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/013,039

(22) Filed: Sep. 4, 2020

(65) Prior Publication Data

US 2021/0004128 A1 Jan. 7, 2021

Related U.S. Application Data

(63) Continuation of application No. 14/871,683, filed on Sep. 30, 2015, now Pat. No. 10,768,771.
(Continued)

(51) Int. Cl.
*G06F 3/0481* (2013.01)
*G06Q 50/00* (2012.01)
(Continued)

(52) U.S. Cl.
CPC .......... *G06F 3/0481* (2013.01); *G06Q 30/00* (2013.01); *G06Q 50/01* (2013.01); *H04L 65/403* (2013.01);
(Continued)

(58) Field of Classification Search
None
See application file for complete search history.

(56) References Cited

U.S. PATENT DOCUMENTS 8,892,648 B1 11/2014 Anderson et al.
2009/0271283 A1 10/2009 Fosnacht et al.
(Continued)

OTHER PUBLICATIONS

International Search Report and Written Opinion dated Jul. 20, 2016, International Application No. PCT/US2016/034272, pp. 1-11.
(Continued)

*Primary Examiner* — Toan H Vu
(74) *Attorney, Agent, or Firm* — Fernando & Partners, LLP

(57) ABSTRACT

A streaming media service can permit artists or other users to create and upload "posts" to the service. Posts can include text, references to content items in the catalog of the streaming media service, and/or non-catalog media content items that are created by the artist and uploaded as part of the post. Posts can be presented to users as they browse the catalog of the streaming media service and/or in a dedicated feed. The rendering of a post on a user device can include graphical user interface controls that allow the user to access content items referenced by or included in the post.

20 Claims, 31 Drawing Sheets

Related U.S. Application Data

(60) Provisional application No. 62/171,812, filed on Jun. 5, 2015.

(51) Int. Cl.
  *G06Q 30/00* (2012.01)
  *H04L 29/08* (2006.01)
  *H04L 29/06* (2006.01)

(52) U.S. Cl.
  CPC .......... *H04L 67/1097* (2013.01); *H04L 67/22* (2013.01); *H04L 67/306* (2013.01)

(56) References Cited

U.S. PATENT DOCUMENTS

| | | |
|---|---|---|
| 2010/0070875 A1 | 3/2010 | Turski et al. |
| 2010/0177938 A1 | 7/2010 | Martinez et al. |
| 2010/0257005 A1 | 10/2010 | Phenner et al. |
| 2010/0257061 A1 | 10/2010 | Frierson et al. |
| 2011/0191406 A1 | 8/2011 | Plunkett et al. |
| 2011/0258556 A1 | 10/2011 | Kiciman et al. |
| 2012/0246032 A1 | 9/2012 | Beroukhim et al. |
| 2012/0317657 A1 | 12/2012 | Glimcher et al. |
| 2013/0083906 A1 | 4/2013 | Roberts et al. |
| 2013/0124437 A1 | 5/2013 | Pennacchiotti et al. |
| 2013/0124651 A1* | 5/2013 | Ding .................. H04L 29/08072 709/206 |
| 2013/0166639 A1 | 6/2013 | Shaffer et al. |
| 2014/0032664 A1 | 1/2014 | Wookey |
| 2014/0040761 A1 | 2/2014 | Liu et al. |
| 2014/0047413 A1 | 2/2014 | Sheive et al. |
| 2014/0074964 A1 | 3/2014 | Cortes et al. |
| 2014/0172982 A1 | 6/2014 | Zhao et al. |
| 2014/0199970 A1 | 7/2014 | Klotz |
| 2014/0280537 A1 | 9/2014 | Pridmore et al. |
| 2014/0344370 A1 | 11/2014 | Kadashevich et al. |
| 2015/0058758 A1 | 2/2015 | Tseng |
| 2015/0101022 A1 | 4/2015 | Zent et al. |
| 2015/0160788 A1 | 6/2015 | Sun et al. |
| 2015/0161565 A1 | 6/2015 | Kraft et al. |
| 2015/0200500 A1 | 8/2015 | Katic |
| 2015/0331551 A1 | 11/2015 | Lee et al. |
| 2016/0004761 A1* | 1/2016 | Zhang .................... H04L 51/32 707/740 |
| 2016/0070442 A1 | 3/2016 | Sorrentino et al. |
| 2016/0196584 A1 | 7/2016 | Franklin et al. |
| 2016/0371471 A1* | 12/2016 | Patton ................ G06F 21/6218 |
| 2017/0039867 A1 | 2/2017 | Fieldman |
| 2017/0093934 A1 | 3/2017 | Napper et al. |

OTHER PUBLICATIONS

Facebook.com, "How to Post & Share / Facebook Help Center / Facebook", Nov. 11, 2012-Dec. 30, 2015 (capture dates), Retrieved from the Internet on Feb. 14, 2016: https://web.archive.org/web/20150724111624/https:www.facebook.com/help/333140160100643, pp. 1-3.

Twitter Support Website, "What is a Following", May 5, 2015, Retrieved from the Internet: https://web.archive.org/web/20150611133019/https://support.twitter.com/articles/14019-what-is-following, pp. 1-3.

Derral, "How to properly upload videos to youtube", youtube.com, Jan. 2, 2014, https://www.youtube.com/watch?v=Hlxqk0iHp5w.

\* cited by examiner

SOCIAL INTERACTION IN A MEDIA STREAMING SERVICE

CROSS-REFERENCE TO RELATED APPLICATIONS

This application is a continuation application of U.S. patent application Ser. No. 14/871,683, filed on Sep. 30, 2015, which claims the benefit of U.S. Provisional Application No. 62/171,812, filed on Jun. 5, 2015, both of which are hereby incorporated in their entirety.

BACKGROUND

The present disclosure relates generally to media streaming services and in particular to facilitating social interaction via a media streaming service.

People love to consume media. With the advance of technology, a great deal of media content (including songs, albums, videos, books, etc.) is now available in digital form. By interacting with online services, consumers can purchase digital media content items, typically in the form of computer-readable data files containing a representation of media content that the consumers' electronic devices can use to render tangible outputs such as images and/or sounds (referred to as playing the content). More recently, the advent of broadband Internet connectivity has led to the development of "streaming" media services that can provide media content items to users' devices on a temporary basis, often in real time (i.e., the rate of data delivery to the user's device can keep up with the rate at which the user's device renders tangible outputs from the data). In general, a "streamed" media content item either is not stored on the user device or is stored only briefly, e.g., in a buffer, to support rendering operations on the user's device. This can allow users to consume media content without being limited by the storage capacity of their devices, often at lower cost than purchasing content items. Some streaming media services may also allow users to temporarily download media content items for offline consumption and/or to purchase media content items for long-term storage on the users' devices.

SUMMARY

Despite these advances in technology, streaming media services retain the traditional model of interactions between the artists who create media content and the users who consume it. An artist can create and publish media content items to a streaming media service (sometimes directly, but more often through a publisher). A user of the service can browse a catalog of published media content items published by the artist and select content items from the catalog to consume (e.g., streaming, downloading, or purchasing, depending on the features of a particular streaming media service). The artist can receive information from the service about users' patterns of consuming content. But beyond this, there is little interaction between artists and consumers.

Certain embodiments of the present invention can facilitate social interaction between artists and consumers (and/or among consumers of media content as desired). For instance, a streaming media service can permit artists (or other authorized users) to create and upload "posts" (also referred to as "artist posts" or "social posts") to the service. Posts can include text, references to content items in the catalog of the streaming media service, and/or other media content items (referred to herein as "uploaded content items") that are created by the artist and uploaded as part of the post, such as a song or voice memo, a video, a photo or other image, and so on; uploaded content need not be part of the catalog.

In some embodiments, an artist's posts can be presented to users as they browse the catalog of the streaming media service. For example, the streaming media service may define various "pages" with listings of catalog items that can be presented to the user. One type of page can be an "artist page" that can list catalog content by a particular artist and can optionally provide other information about the artist (e.g., biographical information). The artist page for a particular artist can incorporate posts created by that artist. As another example, an artist may be able to specify that a particular post they create should be attached to one of their albums (or to another type of content item in the catalog). When a user visits the album's page in the catalog, the attached post can be presented along with other information about the album.

In some embodiments, a user's device can execute an application program (or "app") to interact with the streaming media service. The app can provide a user interface that allows the user to select artists to "follow" and to view a feed of posts by artists the user is following. Each post can be given a distinctive appearance to facilitate user recognition of the artist who posted it.

In some embodiments, the rendering of a post on a user device can include graphical user interface controls that allow the user to access content referenced by or included in the post. For example, where a post includes a reference to catalog content, the user may be able to select the reference (e.g., by tapping on a touchscreen or clicking with a mouse); selecting the reference can result in the app rendering a referenced page in the catalog and/or beginning to stream a media content item identified by the reference. Where a post includes an uploaded content item, the user may be able to select the content item (e.g., by tapping on a touchscreen or clicking with a mouse); selecting the content item can result in the app beginning to stream the content item.

The following detailed description together with the accompanying drawings will provide a better understanding of the nature and advantages of the present invention.

DETAILED DESCRIPTION

The following description focuses on examples where artists create posts that can be viewed and interacted with by users of a streaming media service. For purposes of illustration, the description and drawings may include names of actual artists (individuals and/or bands), songs, and albums, as well as various images (including artwork) that may be proprietary to artists or other third parties. It is to be understood that use of such names and images herein is solely for purposes of illustrating the creation and presentation of posts and other information within the context of this application, and use of such names and images herein is not intended to imply any claim of ownership by the inventors or assignee of this application as to any of the names, images, artwork, or other content. It is further to be understood that use of such names and images does not imply any endorsement of this application by named artists or other third parties or any other connection between this application and any named artists or other third parties. Any statements herein that may appear to be attributed to an actual artist should be understood as fictional.

System Overview

Figure 1:
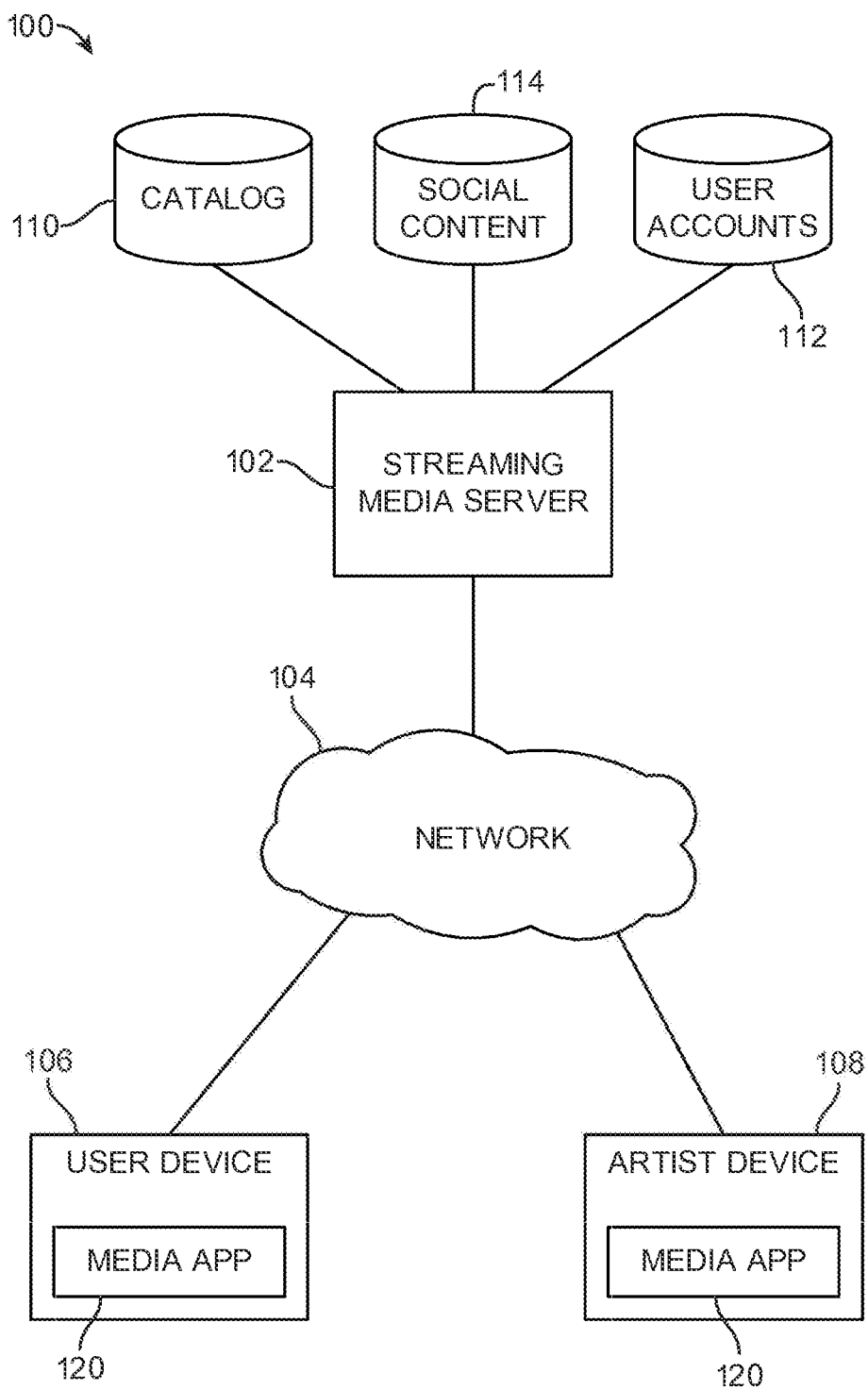
FIG. 1 shows an example of a media delivery system according to an embodiment of the present invention.

FIG. 1 shows an example of a media delivery system 100 according to an embodiment of the present invention. Media delivery system 100 can include a streaming media server 102 communicably connected to a network 104 (e.g., the Internet). User device 106 and artist device 108 can also connect to network 104 and can connect to server 102 via network 104.

Streaming media server 102 can be implemented as a computer system or an interconnected set of computer systems (e.g., a server farm or multiple server farms, elements of which can be geographically dispersed as desired). Streaming media server 102 can have access to a catalog repository 110, which can store media content items that can be streamed or otherwise delivered to user device 106 and/or artist device 108. Catalog repository 110 can be implemented using large-scale data storage and retrieval technologies and can include a collection of media content items (which can be stored as computer-readable data files containing a representation of media content) as well as an index to the collection. The index can be, e.g., a database or other structured data store that associates various items of metadata descriptive of each media content item (which can include any data descriptive of the content item or some aspect thereof) with a reference to the location where the content item is stored. The index can be used to facilitate searching and browsing of media content items stored in catalog repository 110. For example, metadata for a media content item can include a track title (e.g., song title, book title, video title), artist information (e.g., name of a band or individual performer that created the content item), album information (e.g., if the media content item is part of an album), track information (e.g., if the media content item incorporates a collection of related content items referred to as "tracks," such as the individual songs on an album), date of creation, genre information, and so on. A particular storage configuration or indexing scheme is not required.

Streaming media server 104 can also have access to a user account information repository 112, which can store information about user accounts for the streaming media service. User account information repository 112 can be implemented using large-scale data storage and retrieval technologies and can include, e.g., a database of user account records pertaining to accounts established by users with the streaming media service. For example, a user operating user device 106 can communicate with streaming media server 102 to establish an account. Establishing an account can include defining a username and password that can be used to identify and authenticate a particular user. Additional user account information can be collected, e.g., by express user input or automatically based on interactions between user device 106 and streaming media server 102. Examples of user account information can include subscription and payment information (e.g., whether the user is a subscriber and whether applicable subscription fees have been paid), contact information (e.g., email address, phone number, mailing address), demographic information (e.g., age, gender, location, etc.), media consumption history, and so on.

In some embodiments, user account information can also include information pertaining to the user's interaction with social post features described herein, such as which artists (or other users) the user is following, user preferences regarding presentation of social posts, and so on. Examples of such features are described below.

Social content repository 114 can store and facilitate retrieval of posts that can be created by artists (and/or users other than artists where supported). Social content repository 114 can be implemented using large-scale data storage and retrieval technologies and can include a collection of posts (which can be stored as computer-readable data files containing a representation of the content of the post, including uploaded media content items as described below) as well as an index to the collection. In operation, streaming media server 102 can determine when presentation of social content to a user may be appropriate and can query social content repository 114 to identify specific social content items (e.g., posts) to be presented and/or to retrieve social content items for presentation. Examples are described below.

User device 106 can belong to a user of a streaming media service operating through streaming media server 102. User device 106 can include various general-purpose user-operable computing devices, such as a smart phone, a tablet computer, a desktop or laptop computer, a wearable computing device, or the like. In some embodiments, the provider of a streaming media service can provide a media application program 120 (also referred to as a "media app") that, when executed on user device 106, enables user device 106 to interact with streaming media server 102 to browse catalog repository 110, search catalog repository 110, and stream selected media content items from catalog repository 110 to user device 106. Accordingly, media app 120 can provide user account credentials (e.g., username and password) to streaming media server 102, allowing streaming media server 102 to retrieve user account information from user account information storage 112 and to customize the experience for a particular user. It is to be understood that a user can access the same user account on streaming media server 102 using different user devices 106.

Depending on implementation, streaming media server 102 can provide a variety of experiences to user device 106 executing media app 110. For example, media app 120 can present a graphical user interface ("GUI") that allows a user to search or browse the media content stored in catalog 110. In response to user input received via the GUI, media app 120 can send requests for information to server 102 (e.g., a request to view content by a particular artist or a request to view the user's social feed as described below). Server 102 can respond by providing "page data," which can include instructions and/or information items usable by media app 120 to render another GUI image responsive to the request. In some embodiments, the page data can include image content, text elements, references to locations where various elements (e.g., images or icons) used to render a page can be retrieved, hyperlinks or other references to data storage locations (e.g., locations in catalog repository 110) that can be accessed (or not) based on further user input, and so on. In some embodiments, the page data can include a post generated by the server based on posting data; examples are described below. Further, a page (or GUI image) rendered by media app 120 can include user-operable controls to request or control playing of media content items.

Artist device 108 can be similar to user device 106 and can also execute music app 120. Artist device 108 can differ from user device 106 in that artist device 108 is associated with a user account that streaming media server 102 recognizes as being affiliated with an "artist." As used herein, an artist can be a person or entity that has created at least one media content item that is included in catalog repository 110. Thus, for example, an artist can be a musical performance group (also referred to as a "band") or an individual member of a band (e.g., lead singer, bassist, etc.). A user account can become affiliated with an artist through a process (portions or all of which may be performed offline) by which the operator of streaming media server 102 can verify that the user account in question belongs to the artist or by someone else who has the artist's authorization to use the artist's name in connection with the streaming media service (e.g., a publicist, manager, agent, etc.). In some embodiments, information identifying artist accounts as such can be included in user account information repository 112. As described below, in some embodiments, users of accounts identified as artist accounts can be granted privileges not available to non-artist accounts, such as the ability to create and upload posts to social content repository 114.

In operation, user device 106 (or artist device 108) can execute media app 120. Responsive to user input, user device 106 can communicate with streaming media server 102 to identify content to be streamed to user device 106 and to initiate and control streaming of such content. For example, the user can select and play specific content items (e.g., a track or an album).

Depending on implementation, streaming media server 102 may also support other streaming services. For example, the operator of streaming media server 102 may allow certain individuals to act as "curators" who can define playlists of media content items; other users can select a playlist and receive the content items contained therein. As another example, streaming media server 102 can support "radio" stations, which can be ongoing streams of media content that a user can select to experience at any time. In various embodiments, radio stations can include "live" streams (e.g., a digitized version of a terrestrial radio broadcast, other live streaming content including content produced exclusively for the streaming media service) and/or algorithmically-generated (and therefore potentially endless) playlists of content items selected by a computer algorithm according to some criterion (e.g., genre, time period, or similarity to a specific "seed" artist selected by a user).

In addition, in some embodiments, streaming media server 102 can provide ancillary services. For instance, a user may be able to bookmark media content items from the catalog. As used herein, "bookmarking" refers generally to a process by which the user provides input indicating that he or she wants to remember a particular content item or make it easy to find again, e.g., through a list of bookmarked items. In some embodiments, when the user bookmarks a media content item, a data record identifying the content item can be added to the user's account information in user account information repository 112. Media app 120 can provide a control operable by the user to access a list of bookmarked content items.

Another ancillary service can be downloading content items for offline listening. In general, it is assumed that streamed content items are not persistently stored on user device 106 (although they may be temporarily stored or buffered in connection with playing of the content). Downloading can allow a content item to be stored for a longer period and to be accessed in situations where user device 106 might not be able to communicate with streaming media server 102 (e.g., when the user is in an airplane or in an area that lacks connectivity to network 104). In various embodiments, downloaded content may be automatically deleted after a specific time (e.g., 24 hours, 48 hours); a user may also be limited as to the number of content items that can be downloaded at any given time and/or how many times a particular downloaded content item can be played.

Another ancillary service can be purchasing content items. When a content item is purchased, user device 106 can indefinitely store a copy of the content item, e.g., in a local or personal media library. Purchased content items can be played by user device 106 without restriction.

Another ancillary service can be a social posting service. As described below an artist (or in some embodiments, any user) can create a post to be stored in social content repository 114. A post can include various types of content, including a reference to a catalog content item or a non-catalog content item uploaded by the artist (or post creator) to streaming media server 102. User device 106 can present posts from social content repository 114. For example, the user can select artists (or other post creators) to follow and can receive, via media app 120, a feed of posts from the selected artists. As another example, posts by an artist can be presented as part of a catalog page devoted to that artist. As yet another example, posts by an artist can be presented while the user is consuming media content by that artist. Users in turn can interact with posts, e.g., by commenting on the posts, rating the posts, and/or sharing the posts on various social media services (including services that operate independently of the streaming media service). Examples are described below.

In some embodiments, streaming media server 102 can restrict access to some or all of its services to users who have paid an access fee (referred to herein as "subscribers"). For example, users who are not subscribers might be permitted to purchase content items but not to bookmark or download content items, and streaming access by non-subscribers can be limited (e.g., a non-subscriber may be permitted to stream only a limited number of content items per month or to stream only a preview portion of any given content item). Additional or different restrictions can also be applied. In some embodiments, access to some or all of social content repository 114 can be limited to subscribers; examples are described below.

It will be appreciated that system 100 is illustrative and that variations and modifications are possible. Any number of user accounts and user devices (including artist devices) can be supported, and any number of artists can exist. In some instances, multiple user accounts can be affiliated with a single artist identifier (e.g., all members of a band and the band's publicist can be affiliated with the band identifier). Media content items can include any type of media content (including music, spoken-word, books, video, images, etc.).

The ability to create and upload posts to social content repository 114 can be restricted or not as desired. Accounts that can act as a source of posts are referred to herein as having "posting privileges." In some embodiments described herein, it is assumed that only user accounts affiliated with an artist can have posting privileges. In other embodiments, an operator of a streaming media service can grant posting privileges to other users as well. For instance, a "curator" can be a person or entity who is not a creator of any media content in the catalog but who is well known and/or respected among consumers of the media content represented in the catalog; in the case of a music catalog, a curator might be a radio personality (e.g., a disc jockey), music reviewer, or the editorial board of a magazine covering the music industry. In still other embodiments, a streaming media service can allow any subscriber (or any user) to create posts. If desired, restrictions on the number, frequency, or type of posts can be imposed, and different categories of users may be subject to different restrictions.

Posts Overview

Figure 2:
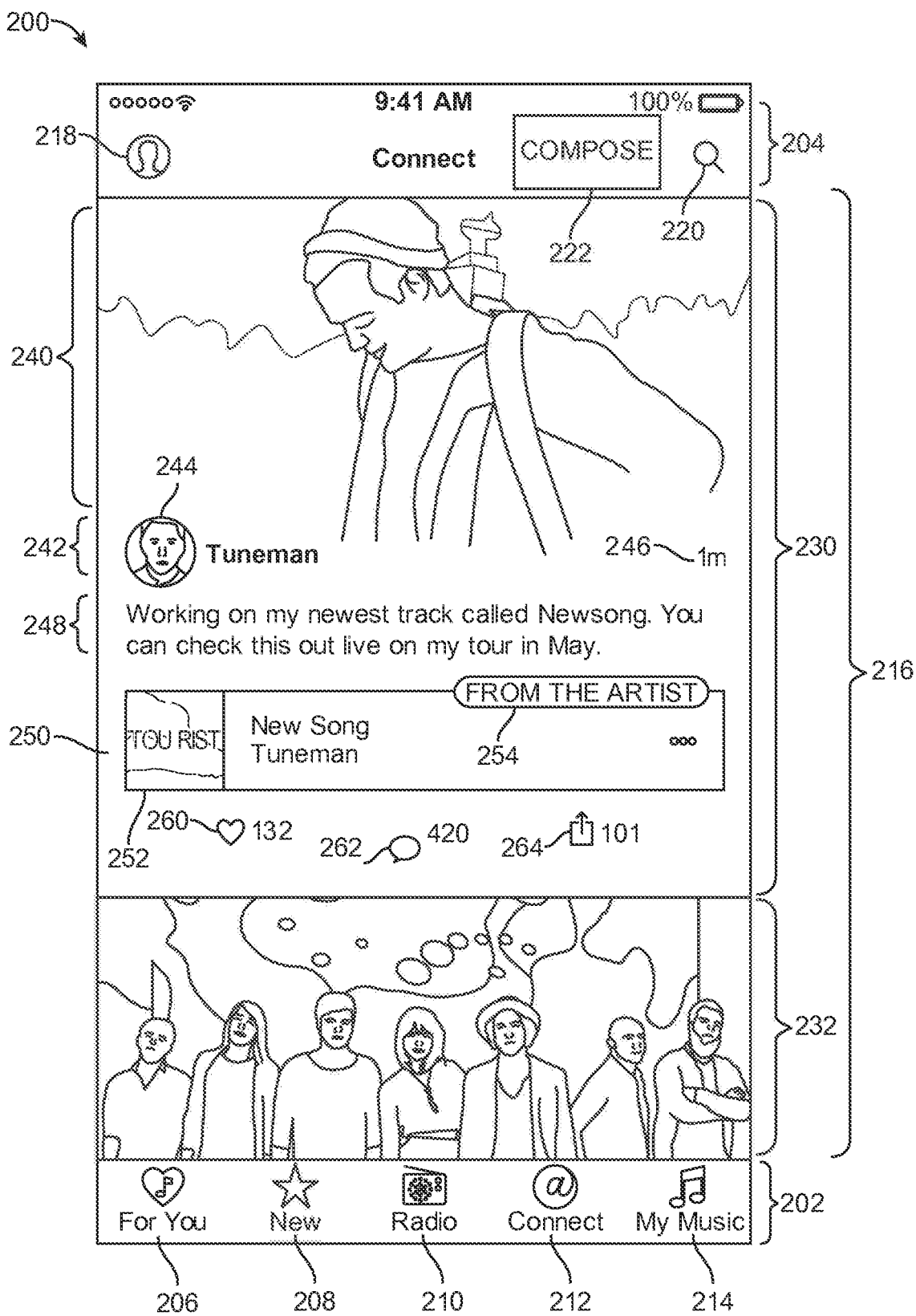
FIG. 2 shows an example user interface screen with a rendering of a post according to an embodiment of the present invention.

FIG. 2 shows an example graphical user interface image 200 according to an embodiment of the present invention. User interface image 200 can be rendered, e.g., by music app 120 executing on user device 106 or artist device 108. For purposes of description, all graphical user interface images (also referred to as "pages" or "screens") shown herein (including screen 200) are assumed to be presented on a touchscreen display, which allows the user to interact with user-operable control elements by tapping on appropriate areas of the display or performing other touch gestures such as swiping to scroll or the like. Other user interfaces can be substituted, such as "point and click" interfaces where the user operates a pointing device to position a cursor and then clicks a button or makes a specific gesture to indicate a selection. The interface images can be adapted for a particular device, e.g., depending on the size and aspect ratio of the display and/or the available user input devices.

User interface screen 200 shows an example of a social feed that can be generated using social content repository 114 and user account information repository 112. In this example, media app 120 can render user interface controls in bottom bar 202 and top bar 204. Bottom bar 202 can include various control elements that a user can operate (e.g., by tapping on a touchscreen) to invoke functionality, such as viewing personalized content and recommendations (element 206), viewing new content (element 208), listening to radio stations (element 210), viewing a social feed (element 212), or viewing a local music library (element 214). In this example, the user has selected element 212 and a social feed is displayed in main screen region 216. Top bar 204 can include control elements to view and/or edit user account information (element 218), search the music catalog (element 220), and compose a social post (element 222). In some embodiments, "compose" element 222 can be presented only if the user has posting privileges as described above.

Main screen region 216 in this example shows a feed of social posts for the user. A complete rendering of a first post 230 can be seen, as well as a top portion of a next post 232. It is to be understood that in this example, the feed can be scrolled vertically to view additional posts and that a feed can include any number of posts. The particular posts included in a feed can be selected for a user, e.g., based on artists the user is currently following (following is described below), and the posts can be ordered in the feed as desired (e.g., in reverse chronological order based on date of posting). The visual arrangement of posts can be varied depending on the dimensions of the available display area on a particular user device.

As shown for post 230, each post can include a number of different visual elements, some of which can be GUI control elements operable by the user to invoke various operations. A "band image" 240 can be prominently featured (e.g., as a large image at the top of the post). The band image can be selected based on a band affiliation of the posting artist; examples are described below. In some embodiments, an artist (or other representative) can provide a band image to the streaming media service to be used in all posts associated with the band or artist; alternatively, the streaming media service can select a band image for some or all bands (or individual artists). The rest of post 230 can have a background color (and text color) that is distinctive to the band. For example, the background color and text color can be selected algorithmically, using an algorithm that takes the colors of the band image as input and generates an output background and text color. Color gradients and/or other color effects can be used as desired. Such features can help to provide a visual distinction between posts.

Below band image 240 is an author identifier 242. Author identifier 242 can identify an author of the post. As described below, a posting artist can assign a "posting identity" to each post and author identifier 242 can be generated based on the posting identity. For example, the posting artist can choose to attribute the posting to a specific member of a band or to the band itself. In this case, the post is attributed to the band; examples of posts attributed to an individual as a member of a band are described below. Author identifier 242 can include a thumbnail image 244 of the author, as well as the posting entity's name.

Timestamp 246 can indicate a creation time of the post, e.g., when the post was received at social content repository 114. In this example, a relative time stamp is used, and "1 m" can be understood as meaning "one minute ago."

Post 230 can also include text 248 and included content box 250. Text 248 can be input into a user interface by the posting artist. In some embodiments, text 248 can provide a description or introduction to a content item represented by included content box 250. In some embodiments, included content box 250 can be rendered with a subtly different background color from the post background color, thereby visually distinguishing included content box 250 from other elements of post 230.

Included content box 250 can refer to an "included" content item which can be any media content item that the artist has chosen to share via a social post. In this example, the included content item is a song called "New Song" that the artist has uploaded as part of post 230; this can be a content item that is not available in catalog 110. The artist can designate an image 252 (e.g., an album cover from one of the artist's albums) to be displayed in included content box 250, and a badge 254 can be added to indicate that the included content item is uploaded content from the artist. In some embodiments, included content box 250 can contain (or be) a user-operable control element, and the user can play the included content item by operating the control (e.g., tapping on included content box 250 or on a specific play control within included content box 250 on a touchscreen display). Numerous types of included content items can be presented in an included content box, including catalog and non-catalog items; additional examples are described below.

User engagement control elements can also be included in post 230, e.g., below included content box 250. In this example, user engagement control elements include uprate element 260, which the user can select to indicate approval of the post; comment element 262, which the user can select to make a comment on the post and/or to view comments from other users; and share element 264, which the user can select to share the post with others. In some embodiments, selecting share element 264 can result in presenting an overlay window with various sharing options; examples of sharing options can include sending an email or text message that includes the content of the post or a reference to a location where the post can be retrieved, posting about the post (optionally including the content of the post) to the user's account at a different social media service (e.g., the eponymous social media services provided by Facebook, Inc. or Twitter Inc.), and/or other options as desired. In some embodiments, a user with posting privileges can also reshare a post within the streaming media service; an example is described below. Where a user shares a post within the streaming media service or via other services, the shared version of the post can include trackback information that allows streaming media server 102 to track interactions with the post (e.g., playing of included content) that may occur as a result of such sharing.

Examples of processes for creating social posts (e.g., post 230) will now be described, followed by additional examples of rendering of posts.

Creating Social Posts

In some embodiments, an artist (or other user with posting privileges) can create a social post while using media app 120. For example, any user interface screen rendered by media app 120 can include a "compose" control element similar to element 222 of FIG. 2, allowing an artist to begin composing a post. As another example, various user interface screens rendered by media app 120 can include a "share" control element similar to element 264, allowing an artist to begin composing a post while viewing, listening to, or otherwise experiencing a media content item the artist wants to post about.

Figure 3:
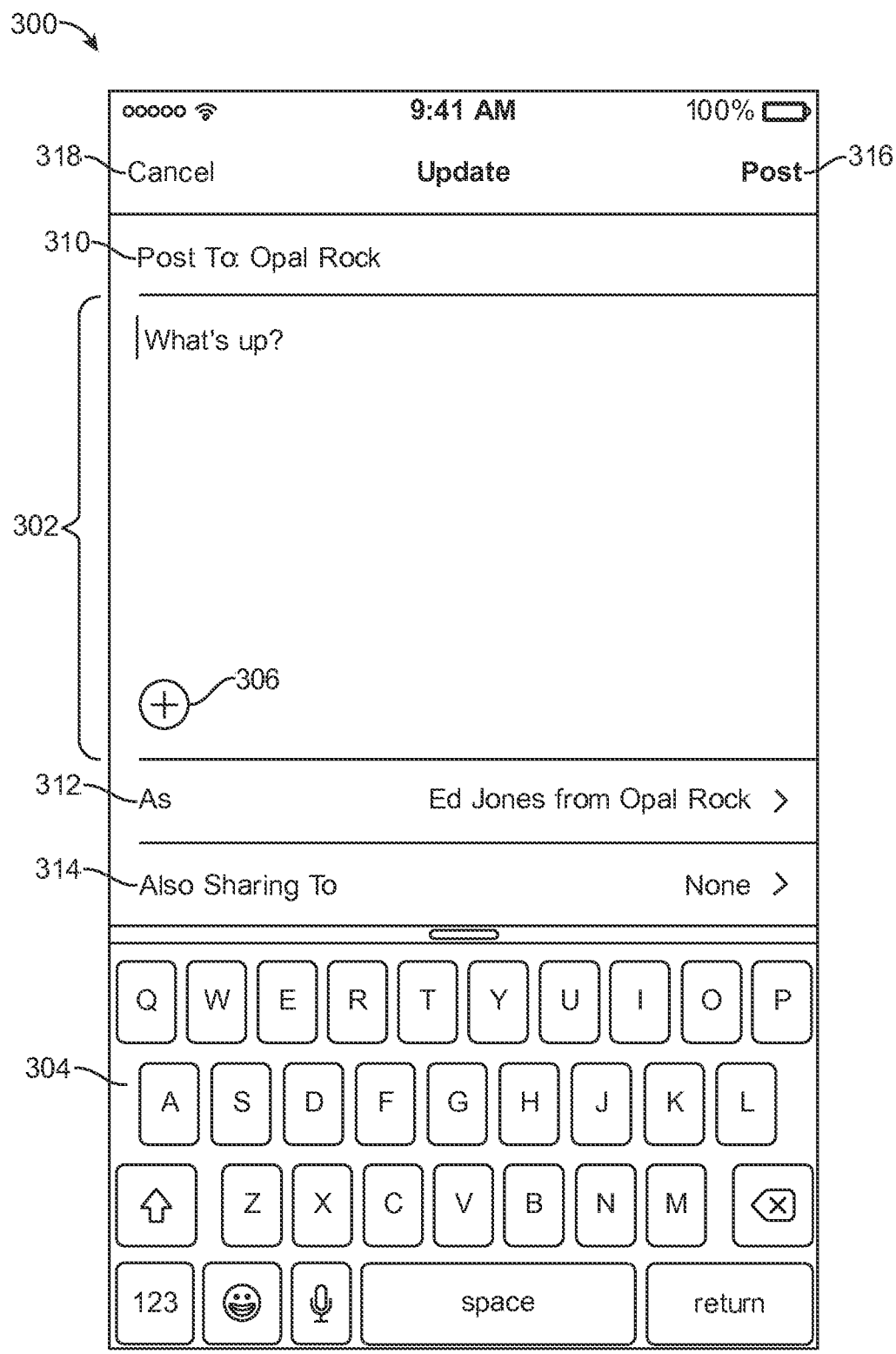
FIG. 3 shows an example of a user interface screen according to an embodiment of the present invention.

FIG. 3 shows an example of a user interface screen 300 according to an embodiment of the present invention. User interface screen 300 can be used for composing posts. In some embodiments, user interface screen 300 can be rendered by media app 120 in response to user operation of "compose" control element 222. User interface screen 300 can provide a text entry area 302 in which the user can enter text. When area 302 is selected (e.g., by tapping on a touchscreen), a virtual keyboard 304 can be presented to facilitate text entry. Text entry area 304 can also include "add" button 306, which is operable to begin a process for selecting an included content item to be included in the post; examples are described below.

In some embodiments, each post in social content repository 114 is associated with a "catalog artist" (i.e., the name of an individual or band to which at least one media content item in the catalog is attributed), and the catalog artist with which the new post will be attributed can be indicated in "Post To" bar 310. However, the post's authorship can be specified differently, using a "posting identity." Various posting identity options can be supported, depending on the particular posting artist. For example, a posting artist who performs in a band (e.g., Ed Jones, a member of a band called Opal Rock) may have the option to select, as the posting identity, either the band's name (e.g., "Opal Rock") or a combination of his name and the band's name (e.g., "Ed Jones from Opal Rock"). A posting artist who has been (or is currently) affiliated with multiple bands may have the option of selecting, as the posting identity, any of the bands' names or a combination of her name and the band's name. A solo artist (e.g., Katy Perry, Beyoncé) may have the option to post under her performing name without identifying a band. The provider of the streaming music service can establish a set of permitted posting identities for each user account that has posting privileges. For instance, a user account belonging to a publicist who represents multiple artists may be able to post under a name associated with any of those artists. The permitted posting identities for a given user account can be stored, e.g., as user account information in user account information repository 112.

Where multiple posting identities are supported, posting identity selection element 312 can be used to select a posting identity. For example, if the user creating a post operates element 312, a list of posting identity options (not shown) can be presented, listing each of the permitted posting identities for that user. The user can select a posting identity from the list and return to screen 300. In some embodiments, "Post To" bar 310 may be updated if the posting identity is changed, and posting identity selection element 312 can show the currently selected option.

"Also sharing" selection element 314 can allow the user to share the new post to other social media services in addition to the streaming media service. In some embodiments, operating element 314 can result in presenting a set of options for social media services to which the new post can be sent.

"Post" element 316 can be selected to send the post to streaming media server 102 and to any other social media services selected using element 314, and "Cancel" element 318 can be selected to cancel the post-creation operation. In some embodiments, if the user has begun composing a post, the user can be prompted to save the post as a draft in response to operation of "cancel" element 318.

Figure 4:
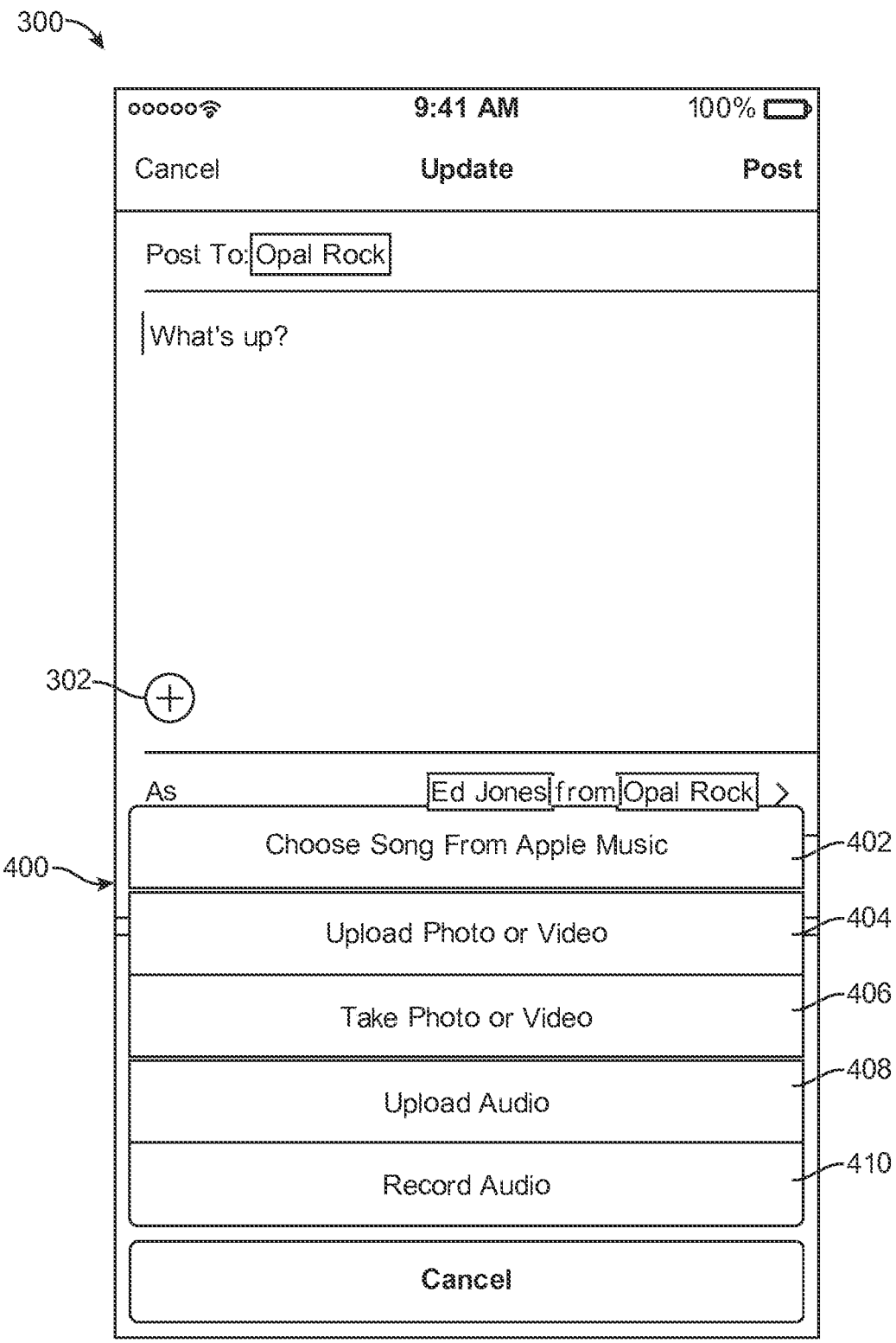
FIG. 4 shows an overlay menu that can be presented with the screen of FIG. 3.

As described above, posts in social content repository 114 can incorporate an included content item. To select an included content item, a user creating a post can operate "add" button 306 of screen 300. FIG. 4 shows an overlay menu 400 that can be presented when the user selects add button 306. Overlay menu 400 can be used to select the type of included content item and to launch additional user interfaces to select a specific content item of the type selected from overlay menu 400.

Figure 5:
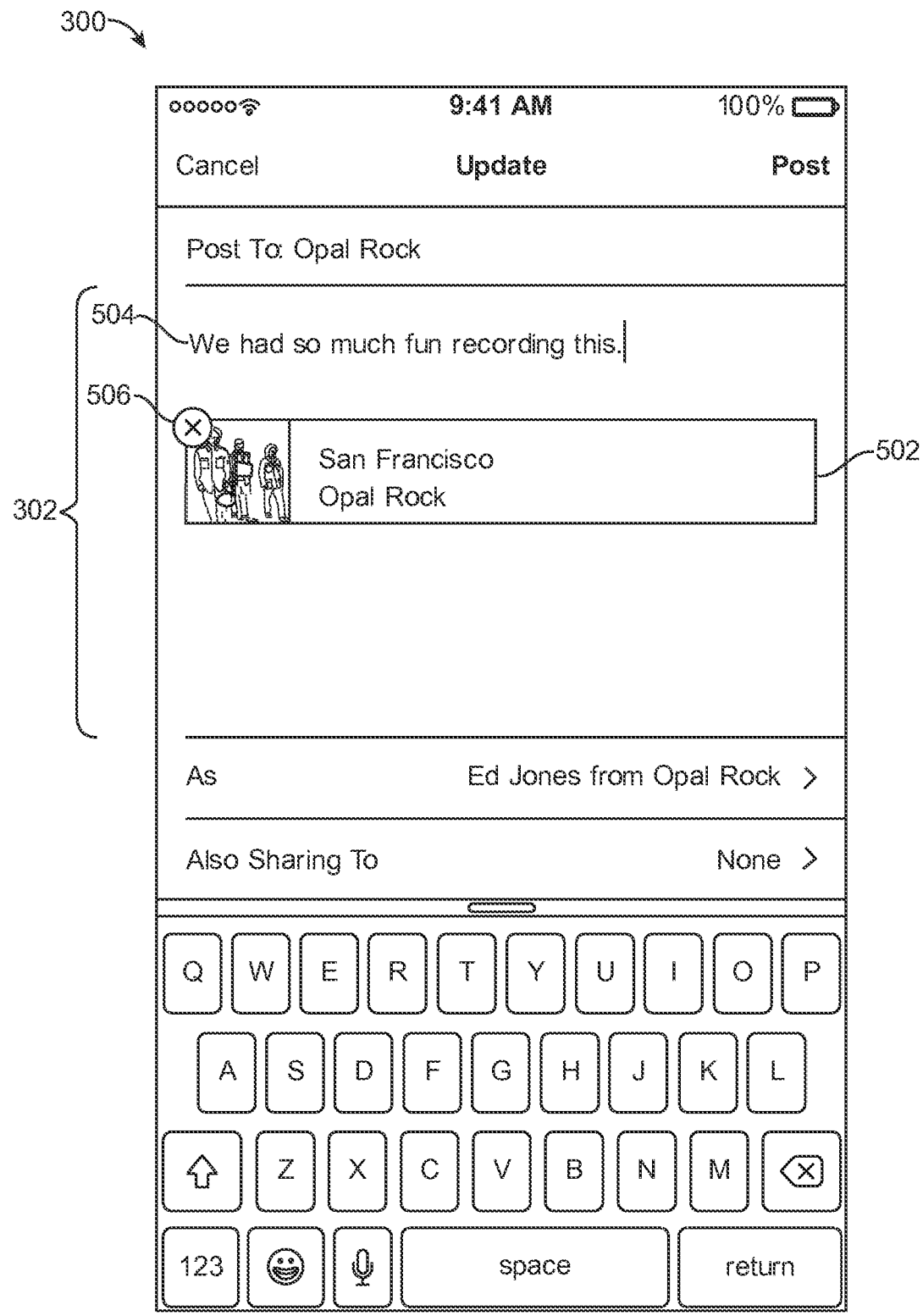
FIG. 5 shows an example of the screen of FIG. 3 with included content according to an embodiment of the present invention.

One type of included content item can be a catalog item or entry (menu option 402). Selection of menu option 402 can result in displaying a search interface screen (not shown), which can be similar to other search interface screens presented by media app 120 for searching catalog repository 110. The posting user can operate the search interface to locate and select a catalog entry. For example, the posting user can be prompted to type a query into a text entry area of the search interface; in response to the query, the posting user can view a listing of items satisfying the query, from which the user can make a selection. The selected catalog entry can correspond to a single content item (e.g., a song), a collection of content items (e.g., an album), an artist (any artist, not limited to the posting artist), a playlist, a radio station, or any other type of catalog information available via streaming media server 102. In some embodiments, a user with posting privileges may have the option to create a post starting from a page presenting a particular catalog entry, in which case the catalog entry can automatically be selected as an included content item. Once a catalog entry is selected, control can return to screen 300 with a representation of the catalog entry included in text entry area 302. FIG. 5 shows an example of screen 300 with an included catalog item 502 in text entry area 302 and some text 504 added. The posting user can remove the catalog item using "X" control 506.

Referring again to FIG. 4, another type of included content item can be an uploaded photo or video (menu option 404). Selection of menu option 404 can result in displaying a photo or video chooser interface. The photo or video chooser interface can support selection of any photo or video stored on the user's device (or, in some embodiments, at a cloud-based storage service accessible to the user's device; the cloud-based storage service can be unaffiliated with the streaming media service). For example, the photo or video chooser interface can present a thumbnail image for each available photo or video, and the post creator can scroll through the thumbnail images to select the desired photo or video to upload. The chooser can, if desired, group photos and/or videos into collections (e.g., albums) or provide various sorting or filtering options to facilitate locating and selecting the desired photo or video. Once a photo or video is selected, control can return to screen 300 with a representation of the photo or video included in text entry area 302.

Another type of included content item can be a photo or video taken while composing the post (menu option 406). Selection of menu option 406 can result in launching a camera app on the user's device to allow the post creator to take a photo or video. Once taken, the post creator can review the photo or video and have the option to use it or discard it and try again. If the post creator chooses to use the photo, control can return to screen 300 with the photo included in text entry area 302.

Another type of included content item can be uploaded audio (menu option 408) that the post creator has previously created or stored on the user device (or, in some embodiments, at a cloud-based storage service accessible to the user's device; the cloud-based storage service can be unaffiliated with the streaming media service). Selection of menu option 408 can result in displaying an audio chooser interface. The audio chooser interface can present a list of available audio recordings, and the user can choose the desired recording. An uploaded audio recording can be, e.g., a song recorded by the posting artist that is not in catalog repository 110, a voice memo, or the like.

Figure 6:
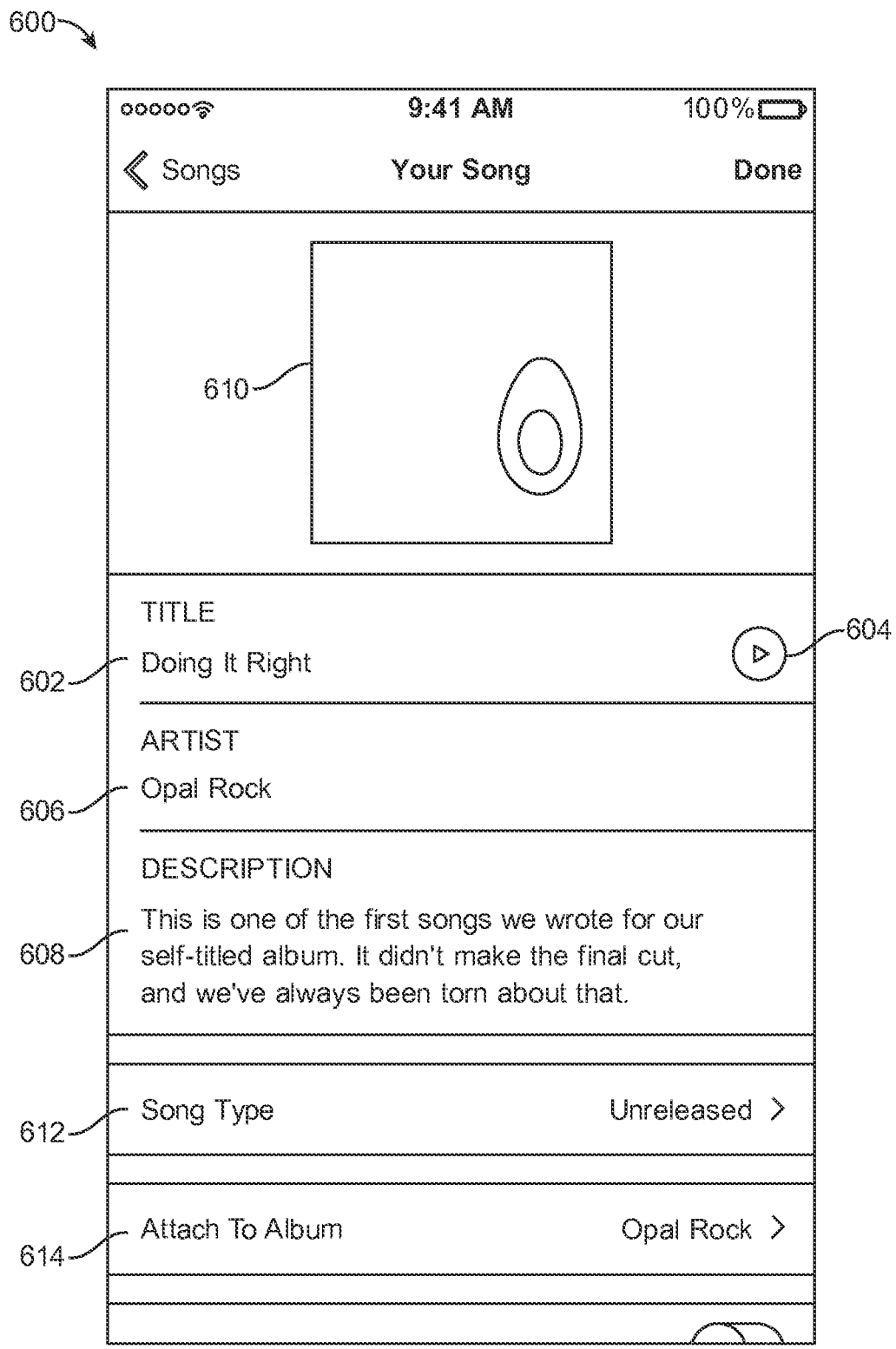
FIG. 6 shows an example of a user interface screen for providing additional information about uploaded audio content according to an embodiment of the present invention.

In some embodiments, additional information about an uploaded audio item can also be added to the post. FIG. 6 shows an example of a user interface screen 600 for providing additional information about uploaded audio content according to an embodiment of the present invention. Screen 600 can be presented, e.g., after the user selects an audio recording to upload using an audio chooser interface. In this example, the audio recording is a song. The title of the selected audio recording is shown in field 602, and the post creator can operate play/pause control 604 to play it (or pause playback). An artist for the selected audio recording can be identified in field 606. In some embodiments, field 606 can be automatically populated, e.g., based on the posting identity selected using selection control 314 described above. For instance, if the posting identity is an individual as a member of a band, field 606 can be automatically populated with the name of the band. In some embodiments, the posting user may have the option to edit the artist name in field 606. In field 608, the posting user can type a description, which can be used as the text of the post. The posting user can also have the option to attach artwork to the uploaded audio content. Field 610 can show the currently selected artwork, and the artist can select different artwork if desired, e.g., by tapping on the image in field 610 to launch an image chooser interface. In some embodiments, the selection of artwork can include a selection of album covers for albums associated with the posting identity or with the artist designated in field 612.

Figure 7:
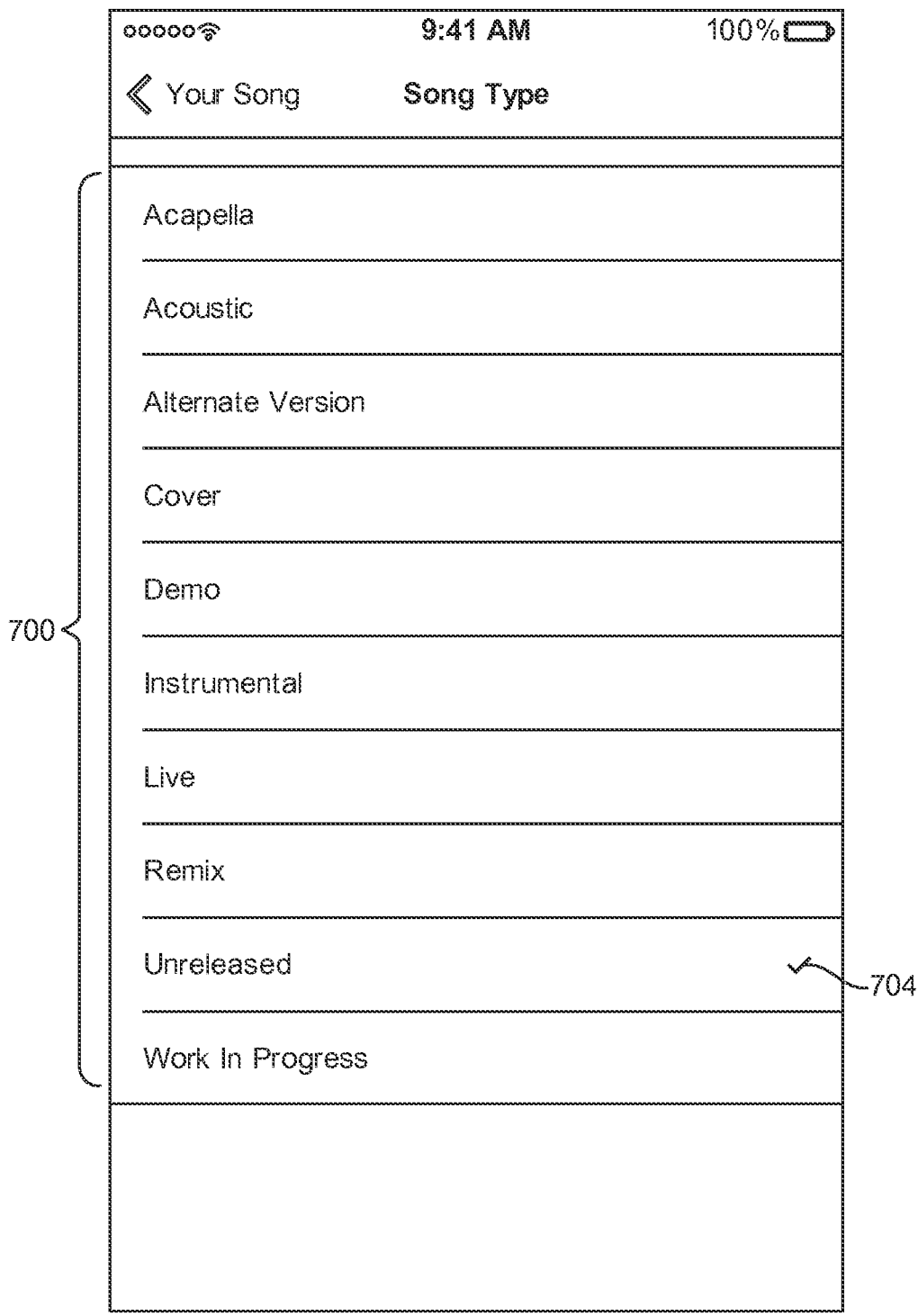
FIG. 7 shows an example of a list of predefined song types from which a posting user can select according to an embodiment of the present invention.

Screen 600 can also allow the posting user to designate a song type using song type selector element 612. The current selection (in this case "Unreleased") can be shown, and operation of selector element 612 can result in presenting a list of predefined song types from which the posting user can select. An example list 700 is shown in FIG. 7, and the post creator can select any option from list 700, e.g., by tapping on the option. The current selection can be shown by a visual indicator, such as checkmark 704. It is to be understood that other song types can be included in the list in addition to or instead of those shown. In some embodiments, selecting a song type can be optional, or there can be a default song type (e.g., "From the Artist"). As described below, a song type can be used to generate a badge for uploaded audio recordings.

Figure 8:
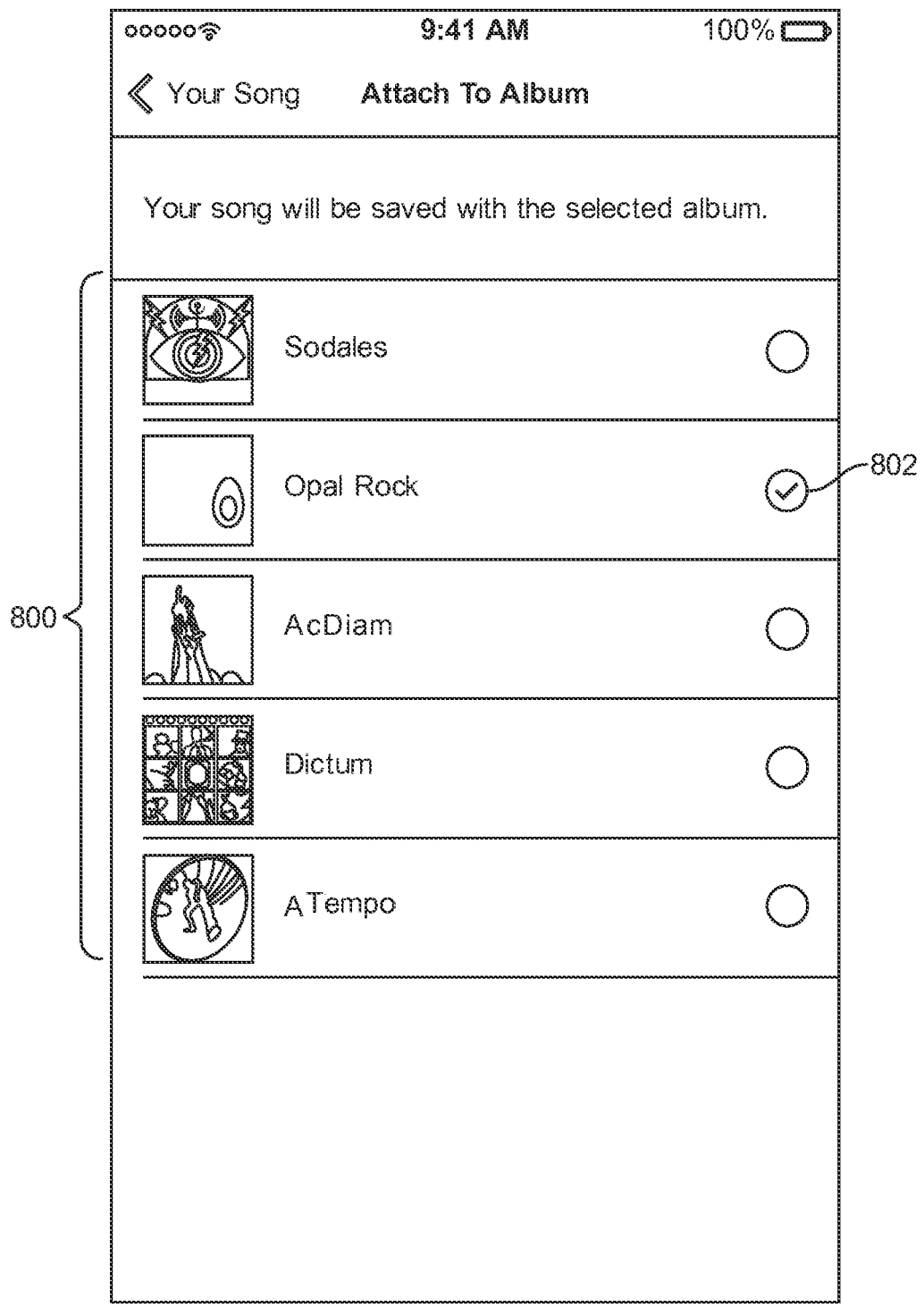
FIG. 8 shows an example of a list of albums affiliated with a posting identity from which a user can select according to an embodiment of the present invention.

Referring again to FIG. 6, screen 600 can also allow the posting user to attach the uploaded audio recording to an album using album selector element 614. In some embodiments, any album affiliated with the posting identity can be selected. For example, operation of selector element 614 can result in presenting a list of albums in the catalog that are associated with the posting identity (e.g., a band if the posting identity is the band or an individual member of the band). An example album list 800 is shown in FIG. 8, and the posting user can select any album from album list 800, e.g., by tapping on the album. The current selection can be shown by a visual indicator, such as checkmark 802. In some embodiments, selecting an album from list 800 can also result in automatically updating the selected artwork in field 610 (FIG. 6) to match the album cover from the selected album. In some embodiments, the posting user can also have an option not to attach the uploaded audio recording to any album. As described below, attaching a post to an album can affect where the post appears.

Figure 9:
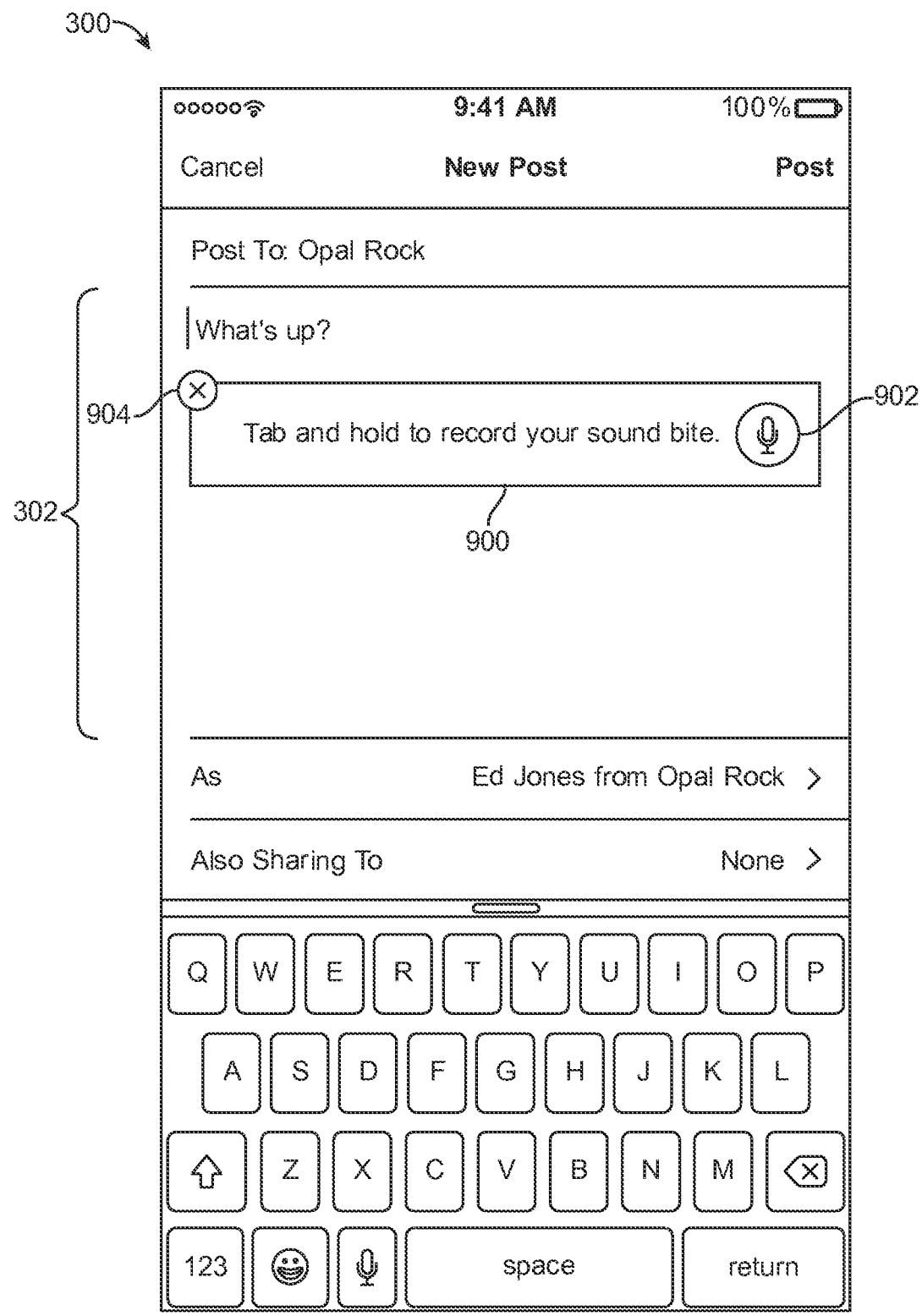
FIG. 9 shows an example of a recording element for creating a post with an included audio clip according to an embodiment of the present invention.

Referring again to FIG. 4, another type of included content item can be an audio clip recorded during the process of composing the post (menu option 410). Selection of menu option 410 can result in a recording element appearing within text entry area 302. FIG. 9 shows an example of a recording element 900 that can be displayed in text entry area 302 in response to a user selecting menu option 410 of FIG. 4. Recording bar 900 can include a control element 902 that the user can operate to begin or end recording of a clip (e.g., tap and hold control 902 to record). In some embodiments, a recorded audio clip (also referred to as a "sound bite") can have an upper limit on duration (e.g., 8 seconds, 10 seconds, 15 seconds, etc.) and recording can automatically stop when that time limit is reached. "X" control 904 can be used to remove recording element 900.

Figure 10:
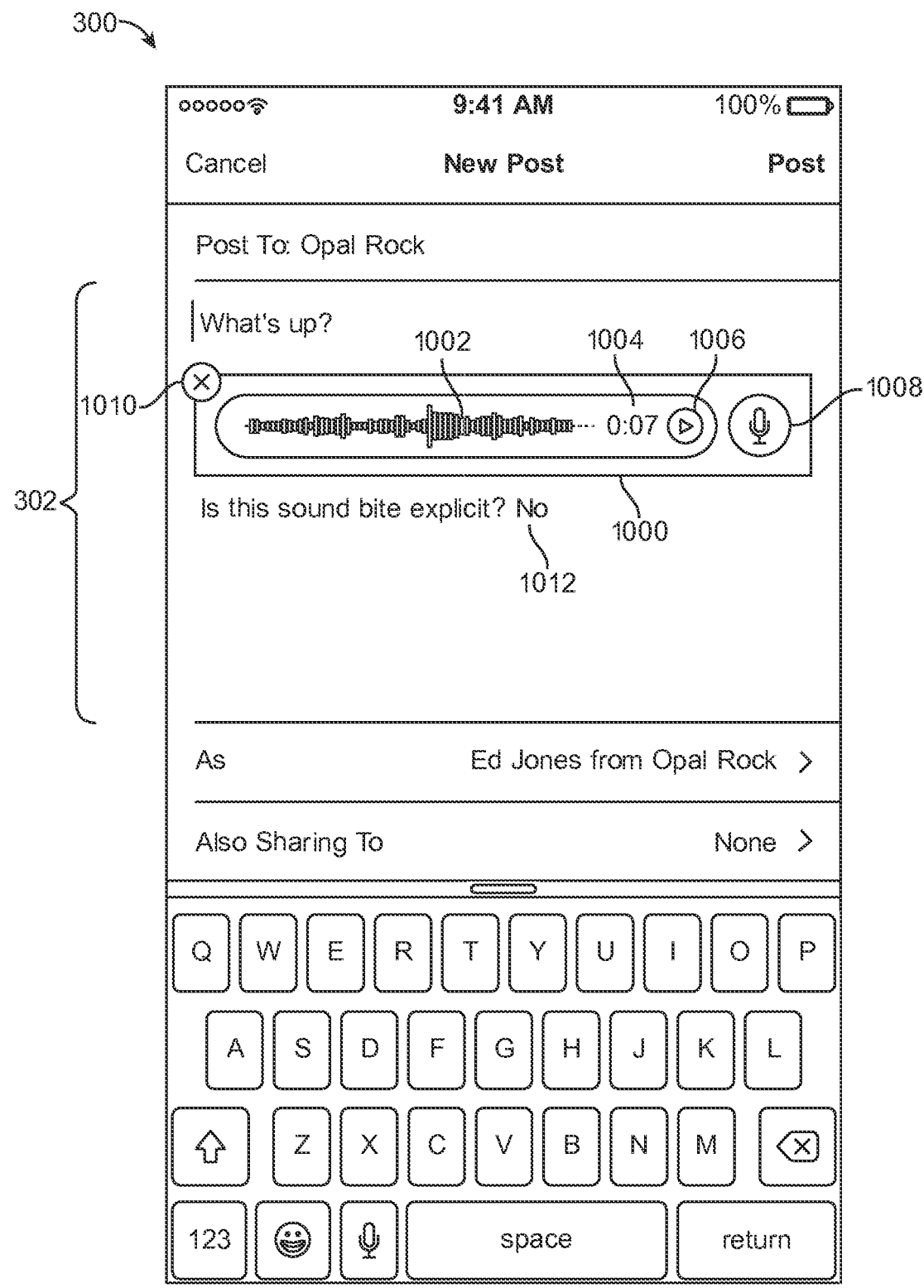
FIG. 10 shows an example of the recording element of FIG. 9 after the user has recorded an audio clip.

FIG. 10 shows an example of a recording element 1000, which can correspond to recording bar 900 after the user has recorded an audio clip. Sound bars 1002 can indicate that audio has been recorded, and time indicator 1004 can show the duration of the recording. Play/pause control 1006 can allow the user to review the clip, and record control 1008 can be operated to record a new clip (which can replace the existing clip). "X" control 1010 can be used to remove recording element 1000 (which can also result in deleting the recorded clip). Prompt 1012 can include a user-operable control to indicate whether the clip is explicit (e.g., includes language that is generally considered offensive).

Using interface screens such as those shown in FIGS. 4-10, a posting artist (or other user with posting privileges) can create a post with an included content item. In some embodiments, an included content item is not required; a post can just contain text. The user can have various other options not shown above. For example, where the post includes an uploaded video or catalog video, the posting user may have the option to select a "cover image" for the video or to designate a video type (similar to song types as shown in FIGS. 6 and 7). Posting users may also have the option to select artwork for other types of included content or for included content types that do not incorporate images.

For any post or any included content item, a user-operable control can be provided to flag the post or content item as "explicit," indicating that the post or content item includes language or visual elements that are considered objectionable to some.

In the examples shown herein, each post has at most one included content item, in addition to a text portion. Other embodiments may permit multiple included content items in a single post. In some embodiments, a post can include multiple versions of the text portion, such as versions in multiple languages or an explicit version and a non-explicit (or "clean") version. The version to be presented to a user can be selected according to the user's personal settings, the region where the device is operated, and/or other information. For instance, a language preference can be based on the region or the user's personal settings (e.g., a default language preference can be based on region, which the user can override); whether to block or allow explicit content can be based on region (e.g., explicit content can be blocked in countries where explicit content is illegal), the user's personal settings, or other information such as whether the user is a minor (e.g., automatically blocked for minors); and so on.

Figure 11:
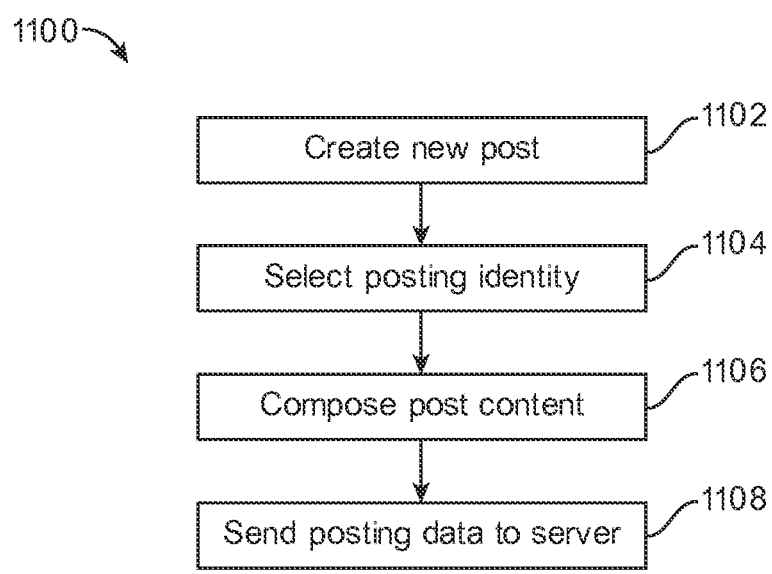
FIG. 11 shows a flow diagram of a posting process according to an embodiment of the present invention.

FIG. 11 shows a flow diagram of a posting process 1100 according to an embodiment of the present invention. Process 1100 can be implemented, e.g., in music app 120 executing on user device 106 of FIG. 1.

Process 1100 can begin when a user with posting privileges provides input to music app 120 to invoke post creation, e.g., by selecting compose element 222 from screen 200 of FIG. 2. At block 1102, process 1100 can begin creating a new post, e.g., by presenting screen 300 of FIG. 3. At block 1104, process 1100 can select a posting identity. For example, as described above, a user can operate control 312 to select a posting identity from a list of posting identities that the user in question is permitted to use. At block 1106, the user can compose the post, e.g., by providing post content as described above; post content can include text and/or an included content item. At block 1108, when the user has finished composing the post, process 1100 can send the posting data to streaming media server 102, e.g., in response to the user operating "post" element 316 of FIG. 3. Streaming media server 102 can add the post, including any uploaded content item (e.g., uploaded song, video, recorded audio, etc.), to social content repository 114. In some embodiments, for uploaded content items, the posting data can include an identifier for the uploaded content item, and streaming media server 102 can use the identifier to initiate an upload of the content item in a separate transaction (which may take some time to complete).

Figure 12:
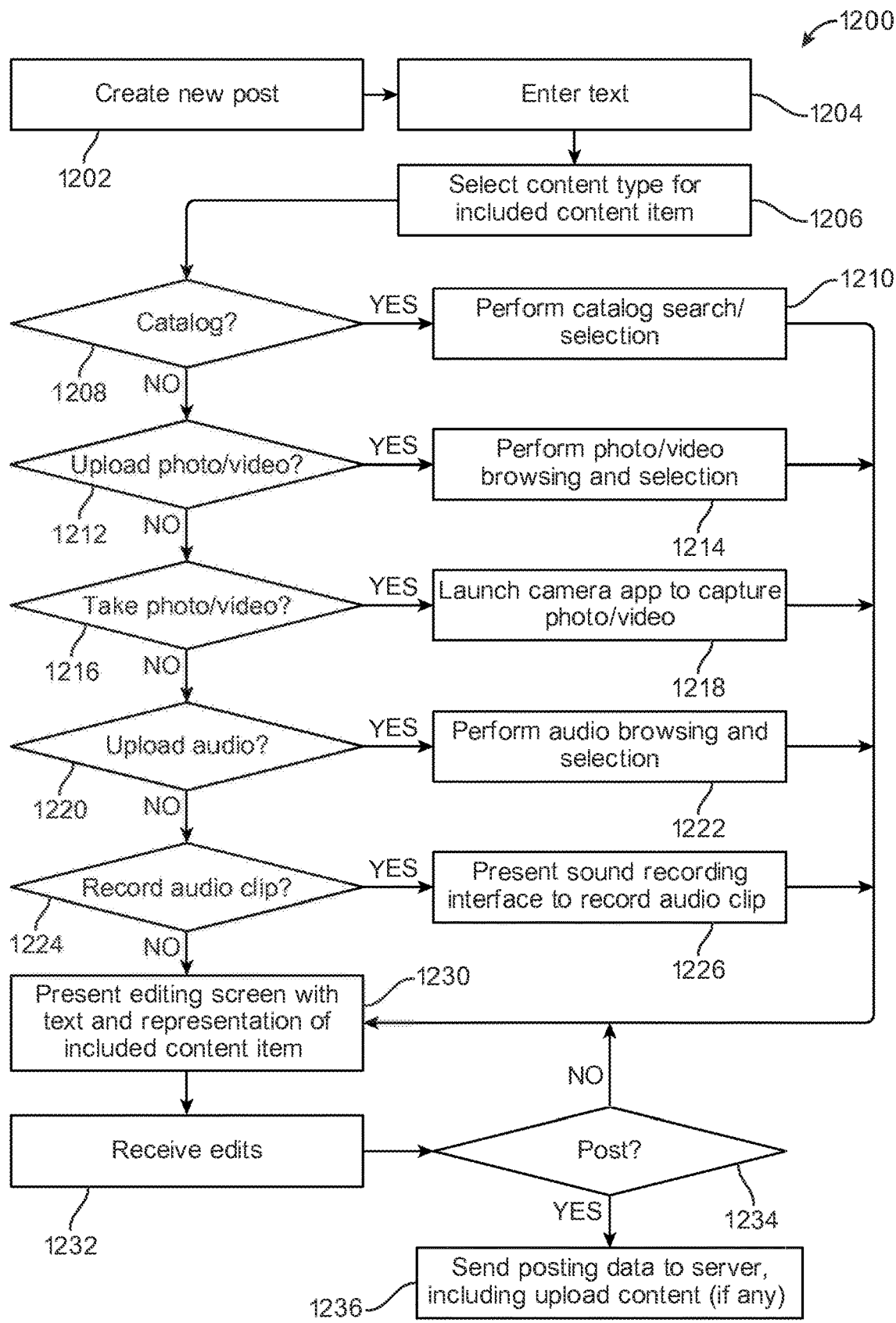
FIG. 12 shows a flow diagram of another posting process according to an embodiment of the present invention.

FIG. 12 shows a flow diagram of a posting process 1200 according to an embodiment of the present invention. Process 1200 can be similar in some respects to process 1100 and can be implemented, e.g., in music app 120 executing on user device 106 of FIG. 1.

Process 1200 can begin when a user with posting privileges provides input to music app 120 to invoke post creation, e.g., by selecting compose element 222 from screen 200 of FIG. 2. At block 1202, process 1200 can begin creating a new post, e.g., by presenting screen 300 of FIG. 3. At block 1204, the user can enter text, e.g., into text area 302 of FIG. 3. At block 1206, the user can select a content type for an included content item (e.g., from menu 400 of FIG. 4).

If, at block 1208, the selected content type corresponds to catalog content, then at block 1210, process 1200 can perform a catalog search and selection process, e.g., using a catalog user interface as described above. Once the catalog content has been selected, process 1200 can continue at block 1230.

If, at block 1212, the selected content type corresponds to an uploaded photo or video, then at block 1214, process 1200 can perform a photo or video browsing and selection process. For instance, as described above, process 1200 can present a photo or video chooser interface. Once the photo or video to be uploaded has been selected, process 1200 can continue at block 1230.

If, at block 1216, the selected content type corresponds to taking a photo or video, then at block 1218, process 1200 can launch a photo or video app to allow the user to capture a photo or video. Once the photo or video has been captured, process 1200 can continue at block 1230.

If, at block 1220, the selected content type corresponds to uploaded audio, then at block 1222, process 1200 can perform audio browsing and selection. For instance, as described above, process 1200 can present an audio chooser interface to allow the user to select an existing audio recording. Once the audio recording has been selected, process 1200 can continue at block 1230.

If, at block 1224, the selected content type corresponds to a new audio clip, then at block 1226, process 1200 can present a sound recording interface to allow the user to record an audio clip, e.g., as described above. Once the audio clip has been recorded, process 1200 can continue at block 1230.

At block 1230, process 1200 can present an editing screen. The editing screen can include any text entered at block 1204 as well as the included content item (if any)

selected using blocks 1206-1226. In some embodiments, the editing screen can be similar to screen 300 as shown in FIGS. 3 and 5 or to screen 600 shown in FIG. 6. It should be understood that an included content item is not required; a post can simply contain text. At block 1232, process 1200 can receive further edits from the user. For example, the user can revise the text, remove or replace an included content item, select or change posting identity, attach the post to an album (e.g., as described above in the context of uploaded audio; the same option can be provided for other types of posts), flag the post as explicit, and so on.

If, at block 1234, the user chooses to post (e.g., using "Post" control 316 of FIG. 3), then at block 1236, process 1200 can send the posting data to streaming media server 102. Posting data can include any data representative of all or part of a post and can be sent in any format as desired. In some embodiments, any uploaded content (audio, photos, video) can be included in the posting data. In some embodiments, sending posting data to server 102 can include sending a notification to server 102 that the user wants to upload a content item (e.g., a song or video), and server 102 can upload the content item in a different transaction. All posting data, including uploaded content items, can be stored in social content repository 114.

Process 1200 can continue until the user chooses to post or cancels the posting operation (not shown in FIG. 12). If the user cancels the posting operation, the user can have the option to save the post as a draft and to return to the draft post later to continue editing.

It will be appreciated that the interface screens and composition processes described herein are illustrative and that variations and modifications are possible. Process steps described as sequential may be executed in parallel, order of steps may be varied, and steps may be modified, combined, added or omitted. In some embodiments, each post can be limited to not more than one included content item; other embodiments can allow multiple included content items in one post. Posts can be described as having a "post type" based on the type of included content item (e.g., text only; catalog album; catalog song; catalog artist; catalog video; uploaded song; uploaded video; uploaded image; audio clip or sound bite; etc.).

Other types of included content items can also be supported besides the examples described. For example, a user with posting privileges can reshare a post by someone else, e.g., by operating share control 254 of FIG. 2 and selecting a "reshare" option from a menu of sharing options. The user can be presented with a post-composing screen similar to screen 300 of FIG. 3, with a representation of the reshared post being included in text entry area 302.

As another example, in some embodiments, a posting user can include a countdown timer in a post. To define a countdown timer, a user interface can be provided via which the user can specify a "target" time where the countdown ends. Whenever the post is rendered (e.g., as described below), the rendering process can use the target time and the current time to render a countdown image (which can be a dynamic image that updates while being displayed to reflect the passage of time). Thus, for example, an artist can create a post announcing an upcoming album release (or other future event), and users viewing the post can see the time remaining until the release.

As another example, in some embodiments, a posting user can include calendar information in a post. For instance, the posting user can include in the post a structured data object (e.g., a spreadsheet) listing locations and dates of performances during an upcoming tour. Whenever the post is rendered (e.g., as described below), the rendering process can use the calendar information together with information about the current date and/or the location of the user for whom the post is being rendered to generate a custom version of the post. For example, in the case of tour dates, the custom version can feature the location and date of the next performance, or the location and date of the performance closest to the user's location (if known). In some embodiments, the user may also be able to view and navigate an interactive calendar that can be rendered based on the calendar information.

Other examples of posting content can include offers of merchandise for sale (e.g. with links to where the user can make a purchase), polls (where the posting user can pose a question that other users can answer by interacting with the post using voting buttons or the like, with results being viewable by the posting user and/or other users as desired), and so on.

In some embodiments, the text portion of a post can include hypertext that provides a URL (uniform resource locator) or other reference to a resource (e.g., a web page that the user viewing the post can access by selecting the hypertext). A user interface for composing posts can include controls to define hypertext and associate a URL or other reference with the hypertext. When a user views a post containing hypertext, the hypertext portions can be rendered in a visually distinct manner (e.g., font color, underline, bold, etc.). The user can select the hypertext, and a web browser or other app on the user's device can be launched to access the associated resource. In some embodiments, the URL can include an internal link to a resource within the streaming music service, e.g., a reference to a location that stores more detailed information about a catalog entry such as an album entry.

In some embodiments, a posting user can schedule a posting. For instance, screen 300 of FIG. 3 or a similar screen can include a "Post Later" option, which the user can select; upon selection of this option, the user can be prompted to specify a scheduled date and/or time for the post. The user can post the scheduled post to streaming media server 102, e.g., by operating post element 316 of FIG. 3, and streaming media server 102 can delay any presentation of the post to users until the scheduled time.

As noted above, posting privileges can be restricted to certain user accounts. For example, in some embodiments, posting privileges are restricted to user accounts that have been verified as belonging to an artist or someone authorized by the artist to post on his or her behalf. Posting identity options can be defined for each user with posting privileges, e.g., based on whether a particular user is or is not authorized to post in the name of a particular individual or band.

Another category of users with posting privileges can be "curators," who need not be affiliated with an artist or band. In the case of a streaming music service, curators can include, for example, radio personalities, music critics, editors of music-industry publications (e.g., "Rolling Stone" magazine), or others whose commentary may be expected to be of interest to users of a streaming music service. In some embodiments, curators can have various posting identities, such as their own name or the name of a publication, organization, radio station, or TV or radio program with which they are affiliated.

Further, in some embodiments, posting privileges can be granted by default to all users (or to all subscribers). The posting identity of a user who is not identified as an artist or curator can be restricted to just being the individual's name that is associated with the user's account.

In some embodiments, different categories of posting users may be subject to different restrictions on the frequency of posting and/or the types of included content. For example, an artist may be allowed to post any type of included content. Curators may be allowed to include catalog content, audio clips, and uploaded photos, but not uploaded videos or uploaded audio. Ordinary users may be allowed to include only catalog content in their posts. As another example, only artists may be privileged to attach posts to their albums. Other restrictions and/or different restrictions can be applied as desired.

Further, in some embodiments, a user with posting privileges may be able to start composing a post from within an app other than music app 120. For example, the user device may have a music creation app or photo app that provides an option to share content items that are created and/or accessed via the app. The sharing options can be extended to include an option to share via the streaming music service, and selecting this option can result in launching composition interface screen 300 or the like.

User Experience:

Posts that are stored in social content repository 114 can be made available, or "surfaced," to users as they interact with the streaming media service. For example, as described above, a user can select artists to follow and view a feed of posts by those artists. As another example, posts attributed to an artist can be surfaced when a user views an artist page for that artist. As yet another example, posts that are attached to an album (e.g., using control 612 of FIG. 6 as described above) can be surfaced when a user views an album page for that album. Posts can also be surfaced while users are experiencing media content items, e.g., via a "now playing" screen. Specific examples are described below.

Figure 13:
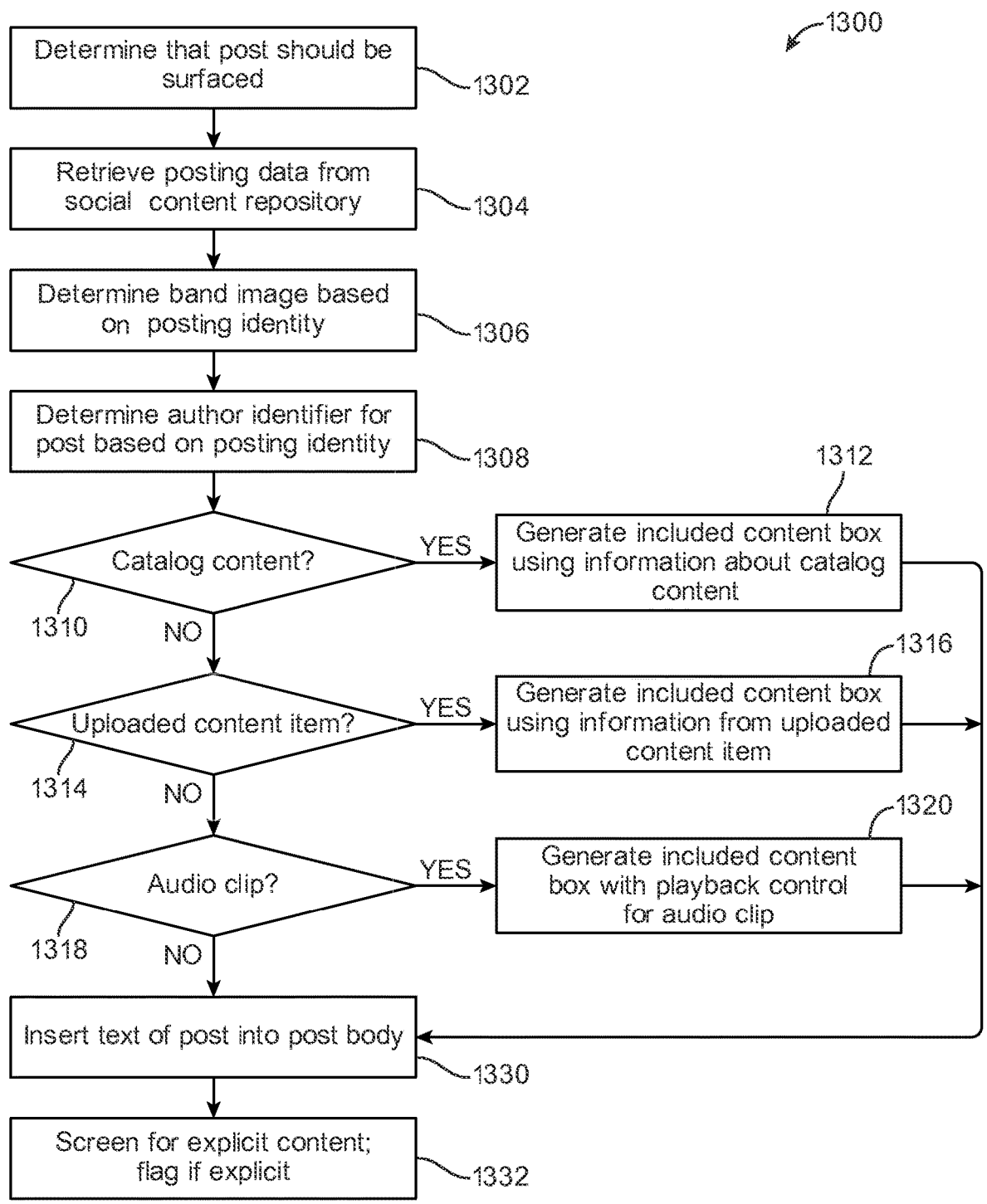
FIG. 13 is a flow diagram of a process for rendering a post according to an embodiment of the present invention.

Regardless of where a post is surfaced, a similar process can be used to render the post for presentation on the user device. FIG. 13 is a flow diagram of a process 1300 for rendering a post according to an embodiment of the present invention. Process 1300 can be implemented, e.g., in streaming media server 102 and/or user device 106. In some embodiments, streaming media server 102 can perform process 1300 to the point of generating a set of instructions (e.g., an HTML file or script) that user device 106 can read and perform to render the post as part of an interface screen.

Process 1300 can begin at block 1302, when streaming media server 102 determines that a post should be surfaced. For example, when a user device requests an artist page, streaming media server 102 can access social content repository 114 to determine whether there are posts from the artist that should be included in the artist page. As another example, when a user device requests a social feed, streaming media server 102 can access user account information repository 112 to determine which artists the user is following, then access social content repository 114 to determine whether there are posts from artists the user is following that should be included in the feed. As yet another example, when a user device requests an album page, streaming media server 102 can access social content repository 114 to determine whether there are posts attached to the album that should be included in the album page.

At block 1304, streaming media server 102 can retrieve posting data for the post to be surfaced from social content repository 114. (If multiple posts are to be surfaced, portions of FIG. 13 can be repeated for each post.)

At block 1306, streaming media server 102 can determine a "band image" for the post based on the posting identity specified for the post. The band image can be a large image that is displayed at the top of the post (e.g., image 240 in FIG. 2). In some embodiments, streaming media server 102 can associate a band image with each band represented in catalog 110. (In this context, a "band" can include a solo performer such as Katy Perry or Taylor Swift.) The operator of the streaming media service can choose the band image, or a band (or solo performer) may have the option to provide its own band image. In some embodiments, streaming media server 102 can maintain one designated band image for each band (including each solo performer), and all posts that have a posting identity affiliated with the band will be rendered using the currently designated band image. Where posts are rendered dynamically, changing the band image can result in different renderings of the same post having a different appearance depending on which band image is current when the post is rendered. In some embodiments, determining the band image can also include determining a background color, text color, and/or other esthetic features of the post.

At block 1308, streaming media server 102 can determine an author identifier for the post (e.g., information to be included in author identification 242 of FIG. 2) based on the posting identity as specified in the posting data. As noted above, the posting identity can refer to the band itself or to an individual affiliated with the band. Where the posting identity refers to the band itself, author thumbnail 244 can be a band-specific thumbnail (e.g., a thumbnail derived from the band image, a band logo, or some other image provided by the band or selected by the provider of the streaming media service). Where the posting identity refers to an individual affiliated with the band, author thumbnail 244 can include an image of the individual (which can be selected by the individual or by the operator of the streaming media service). In some embodiments, the author identifier can incorporate links to additional information about the band and/or the individual.

Process 1300 can also generate an included content box (e.g., box 250 of FIG. 2) based on the included content type. For example, if, at block 1310, the included content type is catalog content, then at block 1312, an included content box can be rendered based on the catalog content. Specific examples of included content boxes for catalog content are described below.

If, at block 1314, the included content type is an uploaded content item (e.g., audio, video, or photos), then at block 1316, an included content box can be rendered based on the uploaded content item (including associated artwork, song type selection, etc.). Specific examples of included content boxes for uploaded content items are described below.

If, at block 1318, the included content type is an audio clip (e.g., a recorded audio clip or sound bite as described above), then at block 1320, an included content box can be rendered that provides a playback control for an audio clip. Specific examples of included content boxes for audio clips are described below.

At block 1330, process 1300 can insert the text of the post into the post body. As shown in FIG. 2, text 248 can be inserted, e.g., below author identifier 242 and above included content box 250. The text of the post can be included in posting data retrieved at block 1304. Inserting the text can include specifying a font, font color, size, etc.

At block 1332, process 1300 can screen the post for explicit content and add an explicit flag if explicit content is found. In some embodiments, screening can occur when posting data is received from a posting user's device, and the flag can be included with the posting area in social content repository 114. Screening for explicit content can include checking whether the posting user flagged the post as explicit (e.g., as described above), with the working assumption being that any post flagged by the posting user as explicit should be treated as explicit. In some embodiments, additional screening can be performed. For example, automated analysis can be applied to the text of a post to detect objectionable words (a list of such words can be maintained by the provider of the media streaming service). In some embodiments, an editorial team employed by the provider of the media streaming service can review posting data (e.g., images, uploaded audio, etc.) and determine whether the post should be flagged as explicit. Flagging a post as explicit may result in the post not being presented to users who have chosen to block explicit content.

FIGS. 14-25 show examples of posts as presented to a user according to an embodiment of the present invention. For purposes of illustration, the posts are shown as they might appear in a user's social feed; it is to be understood that a post can also be rendered on other interface screens, not limited to a social feed. Each post can include certain standard elements (e.g., user response elements) similar to those described above with reference to FIG. 2. As in other examples herein, it is assumed that the posts are rendered on a touchscreen device, and the user can interact with a post by tapping on areas of the screen; other interfaces can be substituted.

Figure 14:
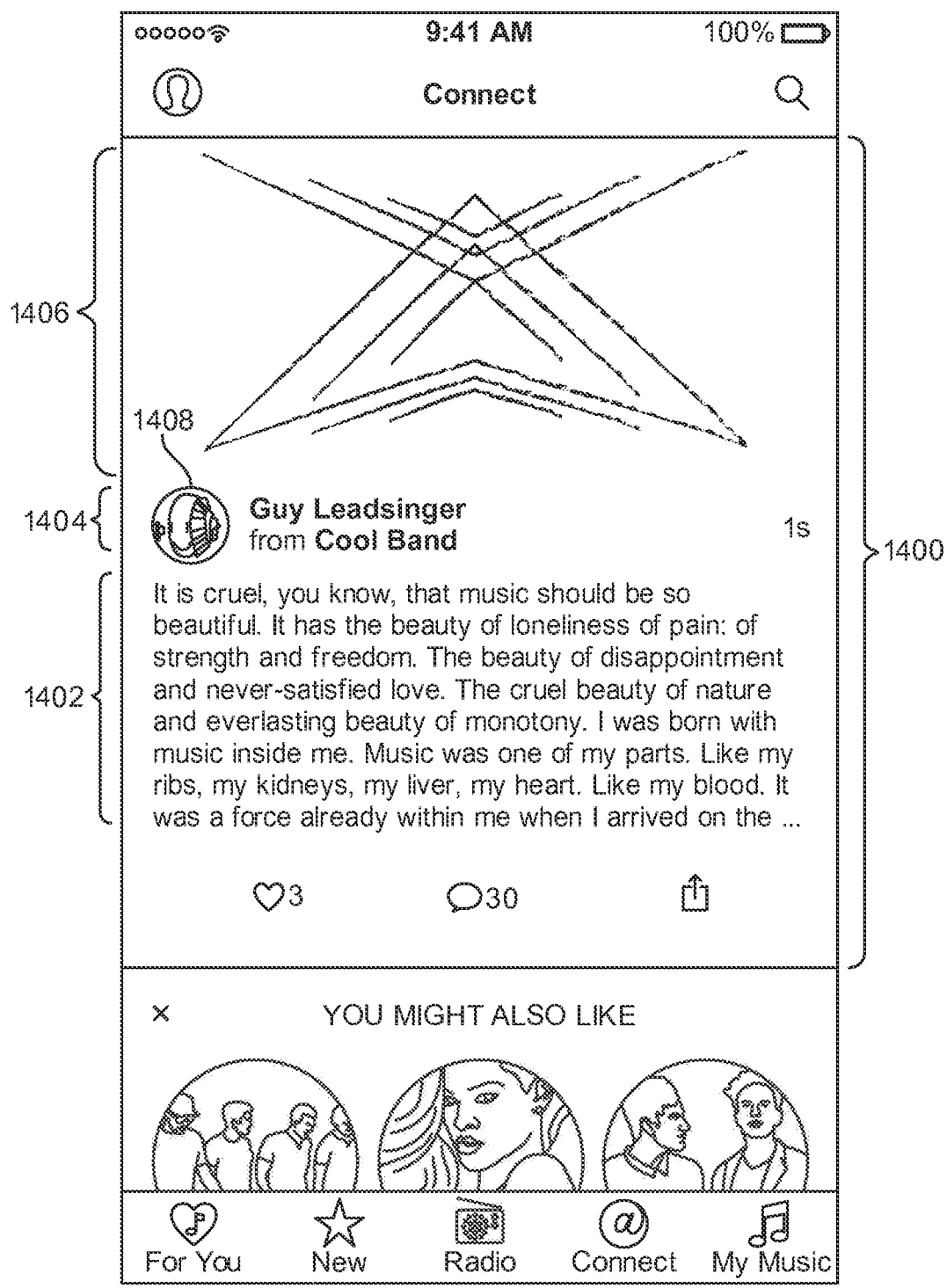
FIGS. 14-25 show examples of posts as presented to a user according to an embodiment of the present invention.

FIG. 14 shows an example of a post 1400 that includes only text 1402. Author identifier 1404 indicates that the post is by a member of a band called Cool Band; accordingly band image 1406 is a band image selected for Cool Band. Thumbnail 1408 can be a different image specifically associated with the individual author. In this example, the amount of text 1402 that can be displayed is constrained as a matter of design choice, and a user can tap on text 1402 to expand the post and view the remainder of the text.

Figure 15:
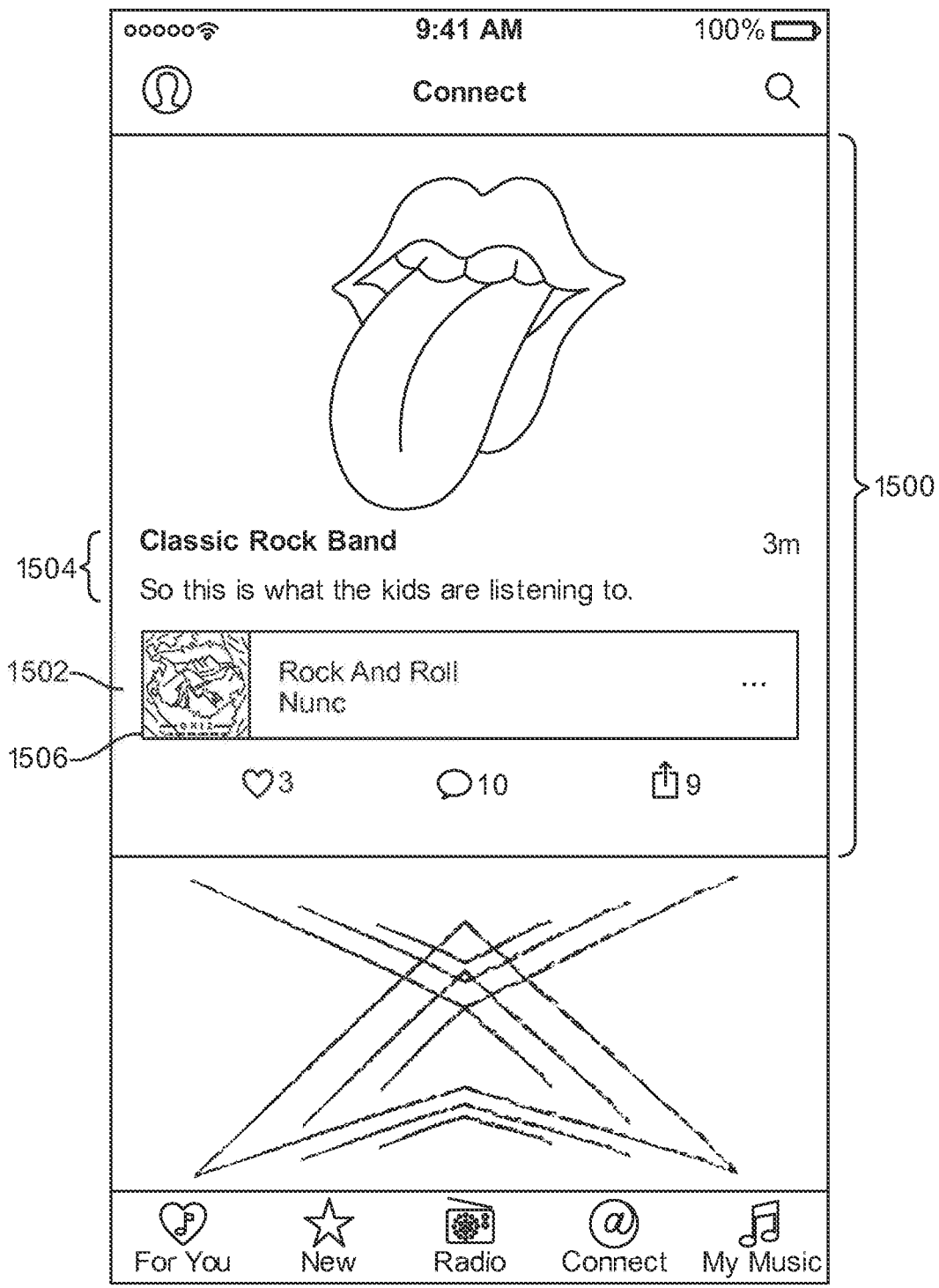

FIG. 15 shows an example of a post 1500 that includes a catalog song. Author identifier 1504 attributes the post to a band called Classic Rock Band (not to an individual band member). In this example, the band has not chosen a thumbnail and accordingly no thumbnail is included in author identifier 1505. An included catalog song ("Rock and Roll," by a band called Nunc) is presented in an included content box 1502 with a thumbnail 1506 that can be, e.g., the cover art associated with the catalog song (or with an album that includes the catalog song). Included content box 1502, or portions thereof, can be an active user control that can allow the user to start listening to the catalog song. In some embodiments, the user may have other options, such as bookmarking the catalog song, downloading the catalog song for offline listening, purchasing the catalog song, etc. It should also be noted that an artist can post any catalog content, including content by other artists, as in this example.

Figure 16:
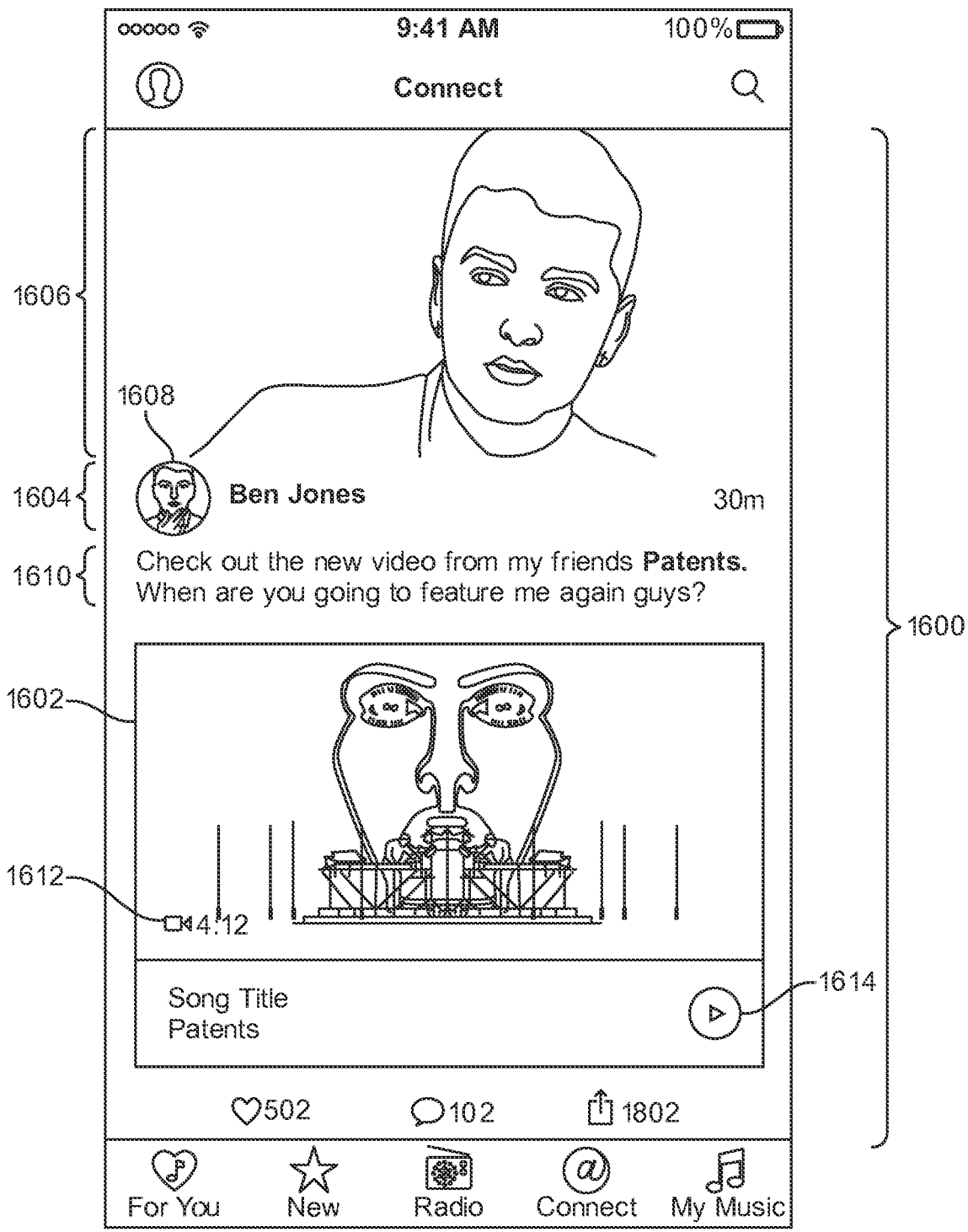

FIG. 16 shows an example of a post 1600 that includes a catalog video. Author identifier 1604 attributes the post to a solo artist, Ben Jones. As shown, Ben Jones can have a band image 1606 that is different from thumbnail image 1608 used in author identifier 1604. Text 1610 in this example includes a reference to the name of another artist (a band called Patents), and the reference can be hypertext that links to an artist page or website for the band Patents. In some embodiments, streaming media server 102 can automatically convert artist names mentioned in a post to hypertext linking to the artist's page from catalog repository 110. The catalog video is displayed in an included content box 1602 that features a "cover" image from the video (the cover image can be associated with the video in the catalog or in some cases selected by the posting user). Also included in content box 1602 are a visual cue 1612 indicating that the content item is a video (and the length of the video), and a control 1614 operable by the user to start playing the video. In some embodiments, the user may have other options, such as bookmarking the catalog video, downloading the catalog video for offline viewing, purchasing the catalog video, etc. It should also be noted that an artist can post any catalog content, including content by other artists, as in this example.

Figure 17:
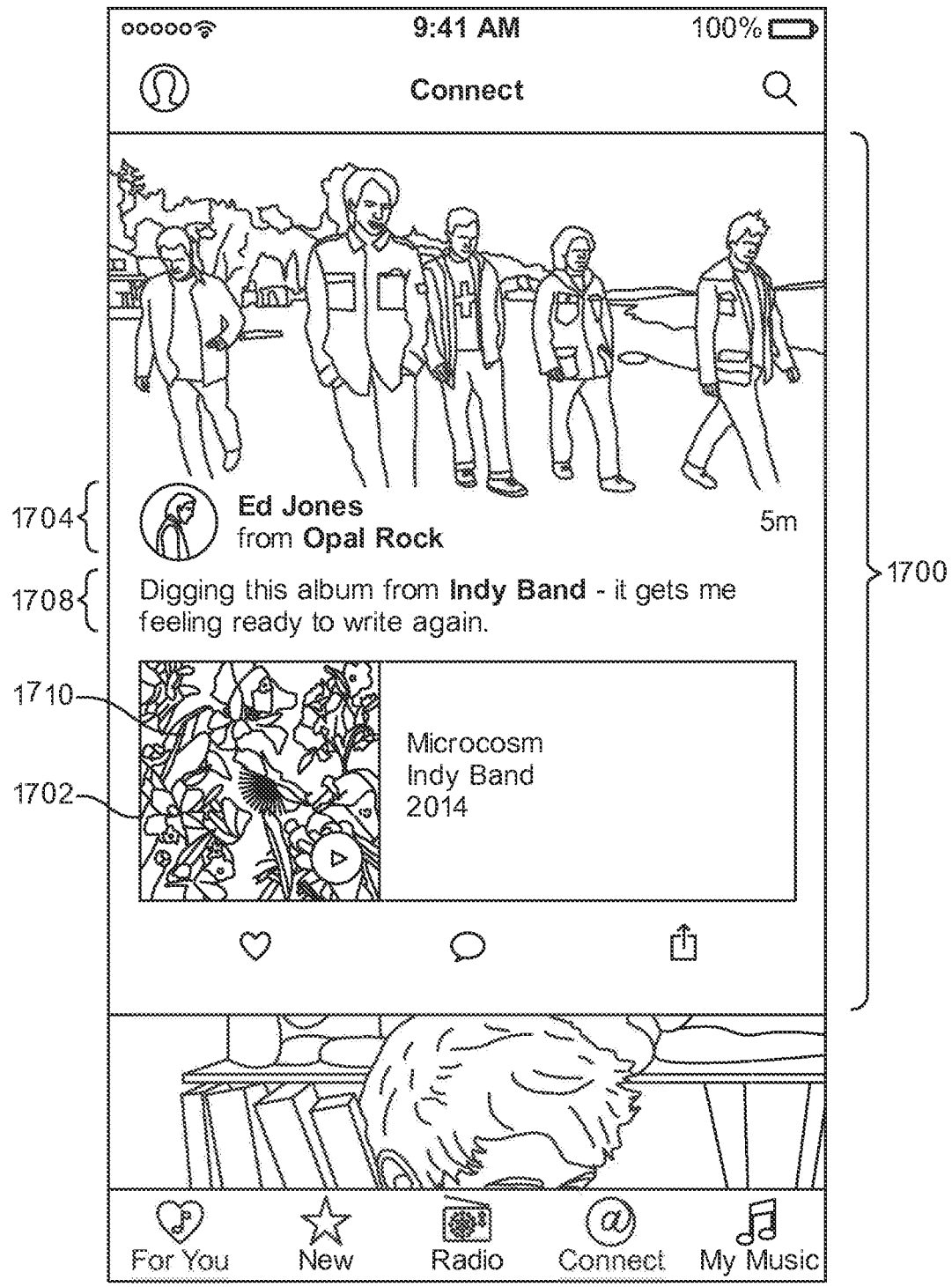

FIG. 17 shows an example of a post 1700 that includes a catalog album. Author identifier 1704 attributes the post to a member of the band Opal Rock, and the band image and author thumbnail are chosen accordingly. Text 1708 in this example includes a reference to the name of another artist (a band called Indy Band), and the reference can be hypertext that links to an artist page for the band Indy Band. The included catalog album is presented in an included content box 1702 that incorporates the album cover 1710, album title ("Microcosm"), artist ("Indy Band"), and year of release ("2014"). In some embodiments, album cover 1710 can include or be a user-operable control that the user can tap on to begin playing the album. In some embodiments, the user can tap on other areas of included content box 1702 to navigate to the album page. In some embodiments, the user may have other options, such as bookmarking the album, downloading the album, purchasing the album, etc. It should also be noted that an artist can post any catalog content, including content by other artists, as in this example.

Figure 18:
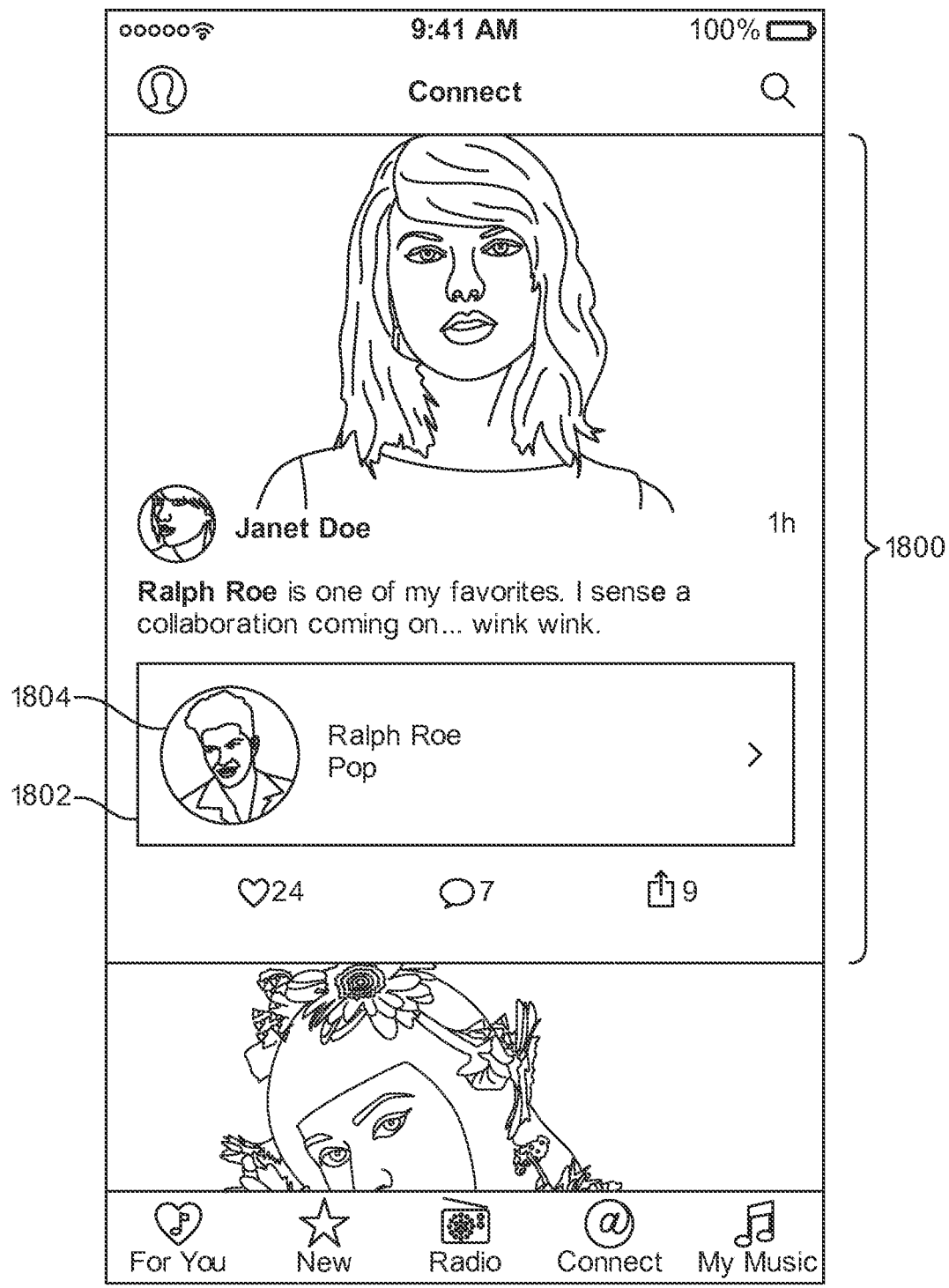

FIG. 18 shows an example of a post 1800 where the included content item is a reference to a catalog artist. The referenced catalog artist is presented in an included content box 1802 that can incorporate an artist thumbnail 1804 for the referenced artist. Included content box 1802 can also provide a user-selectable link to navigate to the artist page for the referenced artist.

Figure 19:
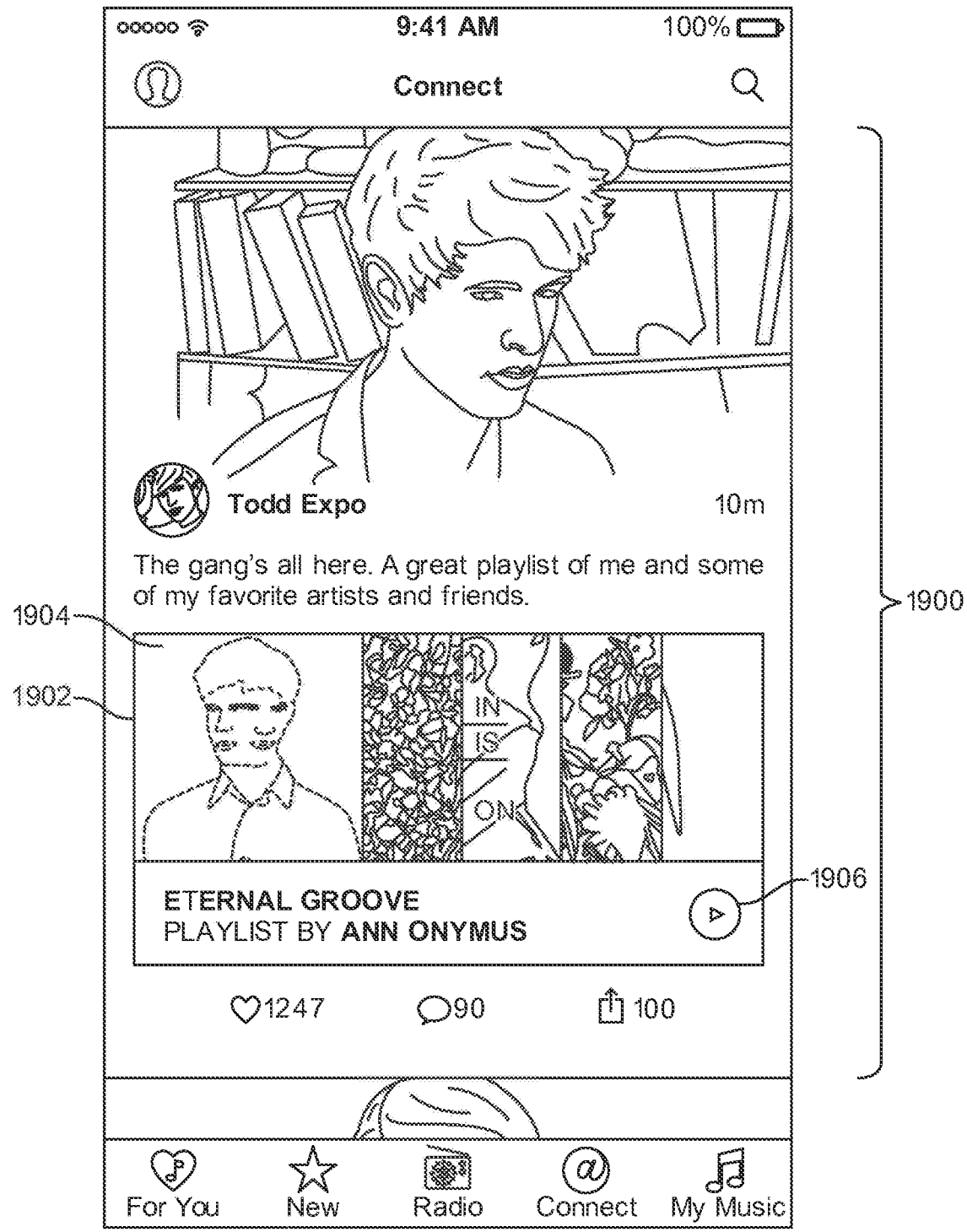

FIG. 19 shows an example of a post 1900 where the included content item is a catalog playlist. The playlist is presented in an included content box 1902 that can incorporate the name of the playlist and the name of the playlist's creator. In this example, a graphic element for the playlist can incorporate album covers 1904 for various songs in the playlist (e.g., the first five songs) arranged in an overlapping stack fashion as shown. In some embodiments, a user can perform a "drag" gesture on one of the album covers, e.g., dragging the cover rendering to the right for an unobstructed view; when the user releases the drag gesture, the cover can "snap" back into place in the stack, or the user can slide the cover back into place by reversing the drag gesture. The user can operate control element 1906 to play the playlist. In some embodiments, selecting control element 1906 or other areas within included content box 1902 can allow the user to navigate to a playlist page that can provide a list of included songs and optionally other information about the playlist. In some embodiments, the creator of a playlist can specify a "cover" image for the playlist, and that image can be used in place of album covers.

Figure 20:
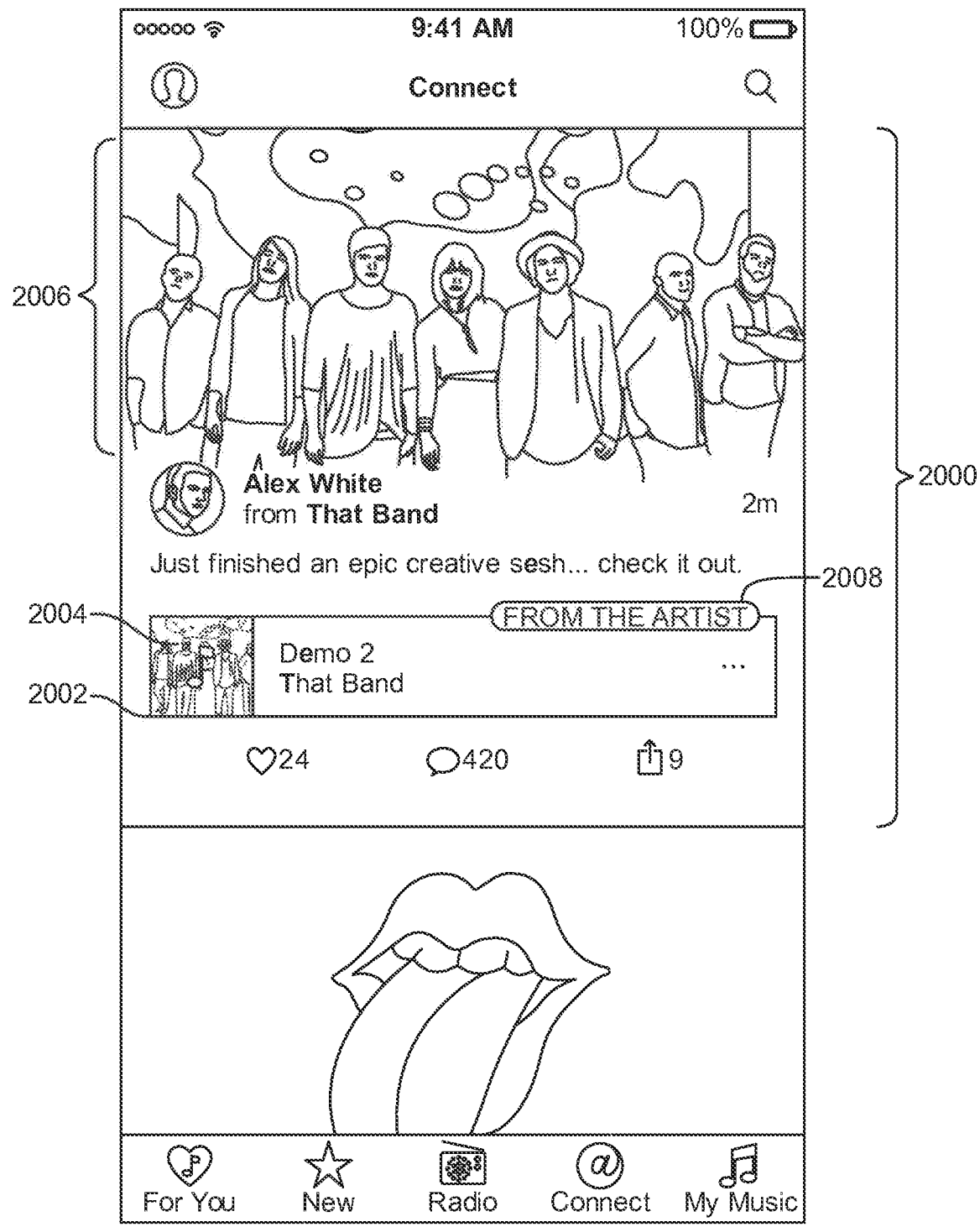

FIG. 20 shows an example of a post 2000 wherein the included content item is an uploaded song. The uploaded song is presented in an included content box 2002. Included content box 2002 can present the name of the song and the artist (e.g., as specified by the posting user at interface screen 600 of FIG. 6). In this example, the posting user did not choose an artwork image in section 610 of interface screen 600, and a default image 2004 can be rendered. Default image 2004 can be, e.g., a reduced-size version of band image 2006 with a musical note overlay; other images can also be chosen. Badge 2008 can indicate that this is uploaded content from the artist (as opposed to catalog content). Included content box 2002, or portions thereof, can be an active user control that can allow the user to start listening to the uploaded song. In some embodiments, the user may have other options, such as bookmarking the uploaded song, downloading the uploaded song for offline listening, etc.

Access by users to uploaded songs (and other uploaded content) can be managed as desired. In some embodiments, posts are only presented to users who are subscribers to the streaming media service, and accordingly access to uploaded songs can be limited to subscribers. In some embodiments, posts are presented to all users, but only subscribers can listen to uploaded songs; if a non-subscriber attempts to listen, a user interface screen can appear to prompt the user to subscribe in order to listen. In some embodiments, the artist can have an option to charge a fee for listening to or downloading uploaded songs. In still other embodiments, any user whose device can present the post can listen to uploaded songs for free. (Artists who do not want to give away content can limit their posting accordingly.) In some embodiments, users can add uploaded songs (and other uploaded content) to their personal media library and/or include uploaded songs (and other uploaded content) in user-created playlists.

Figure 21:
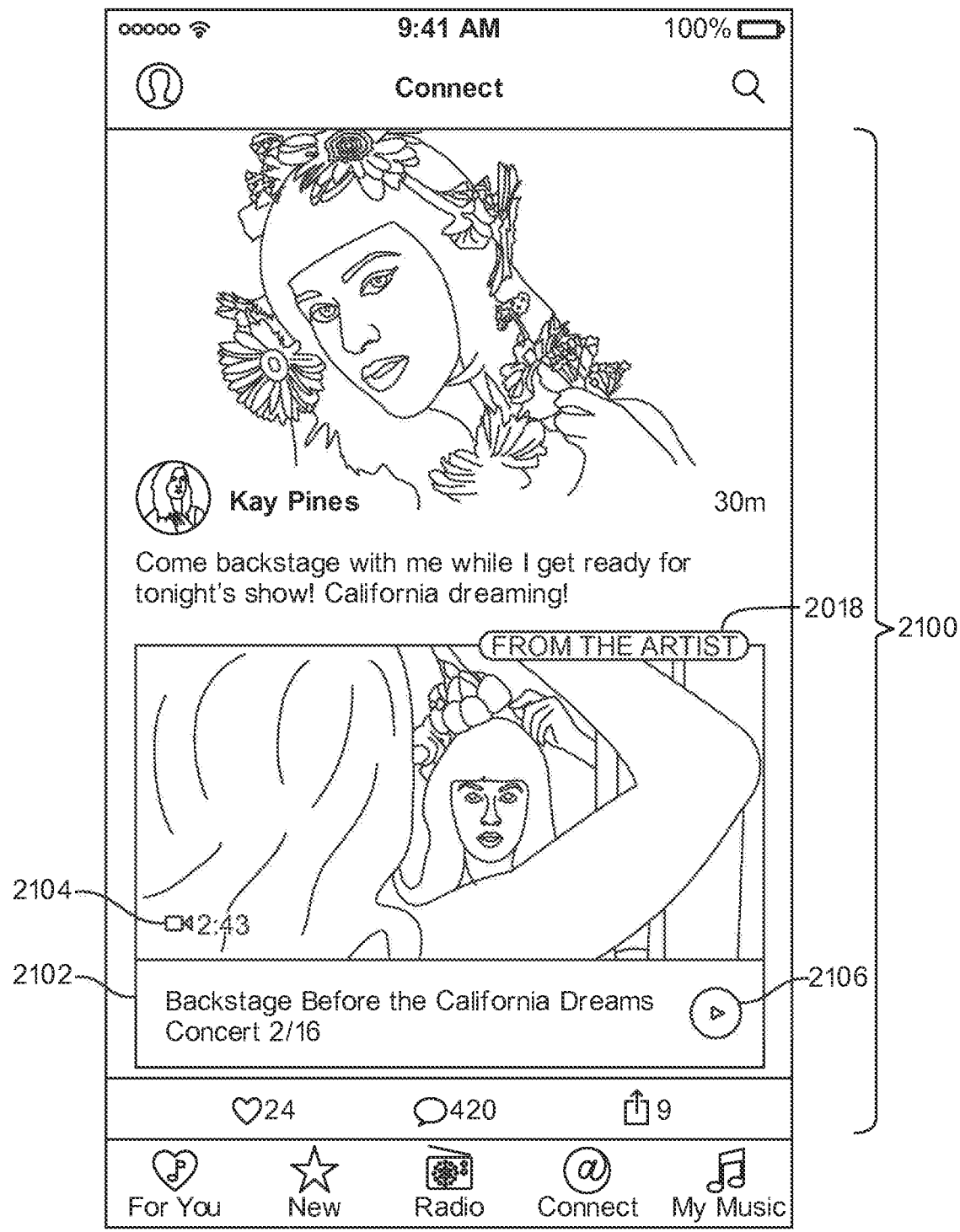

FIG. 21 shows an example of a post 2100 wherein the included content item is an uploaded video. The uploaded video is presented in an included content box 2102. Included content box 2102 can be similar to included content box 1602 for a catalog video (as shown in FIG. 16), with visual indicia 2104 that the included content item is a video and user-operable control 2106 to play the uploaded video. Included content box 2102 can include badge 2108 to indicate that the video is uploaded content from the artist (as opposed to catalog content). As with other types of included content, the user may also have other options such as bookmarking the uploaded video, downloading the uploaded video for offline viewing, etc. And as with uploaded songs, various access limitations can be implemented if desired (e.g., making uploaded videos available only to subscribers).

Figure 22:
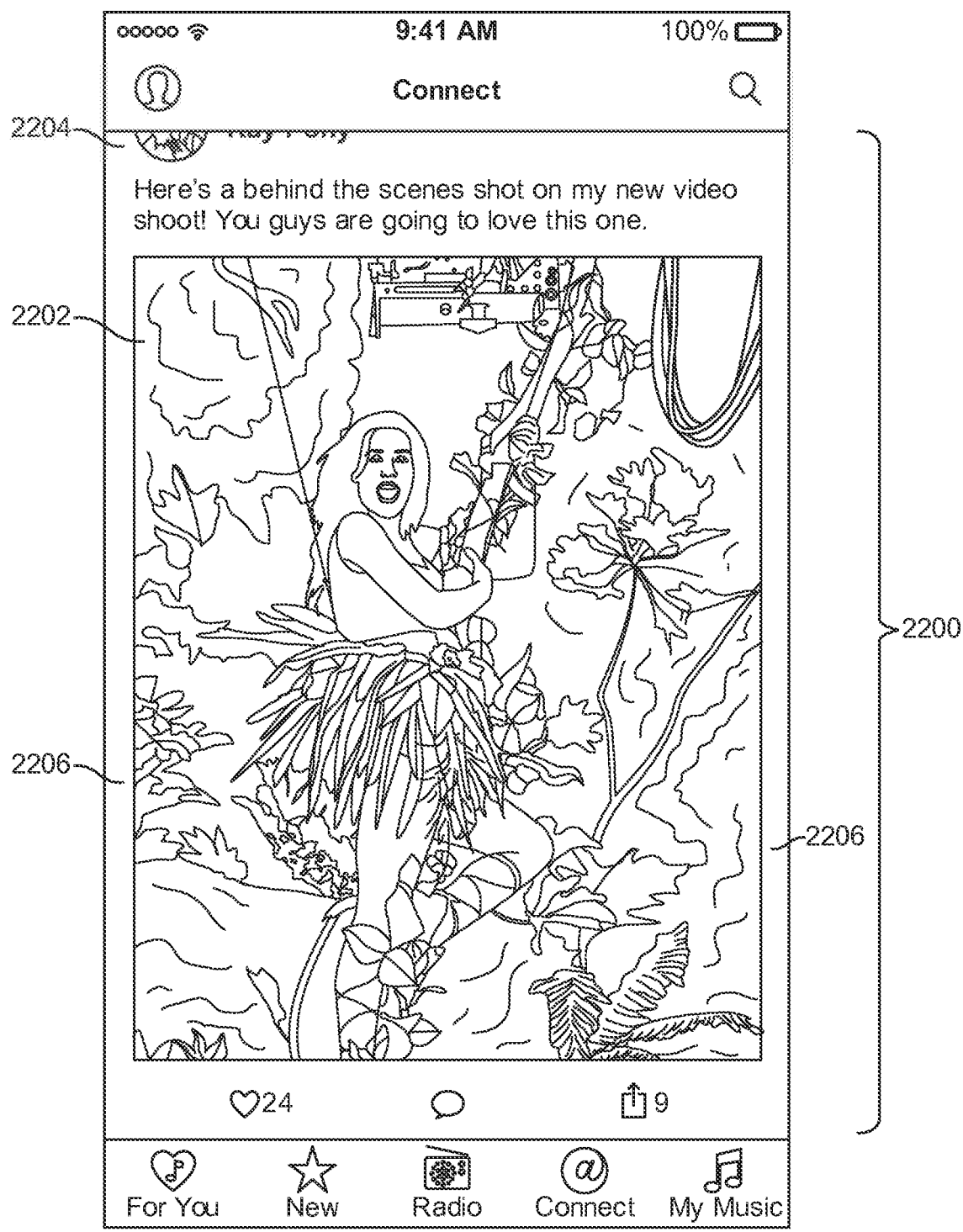

FIG. 22 shows an example of a post 2200 where the included content item is an uploaded photo. In this example, included content box 2202 can simply contain the photo. The photo can determine the vertical height of post 2200; hence the band image and most of artist identifier 2204 are scrolled off the screen, allowing the photo to be seen. In some embodiments, the photo can be sized to be as large as possible while still being entirely visible onscreen without scrolling. It may also be desirable to "frame" the photo with left and right side borders 2206 in the post background color, to convey that the photo is an included content item in a post (so that the post is visually distinguished from other posts or other page elements). In some embodiments, a user can tap on included content box 2202 to obtain an option to download the photo (or other options); in other embodiments, content box 2202 might not be an active interface element.

Figure 23:
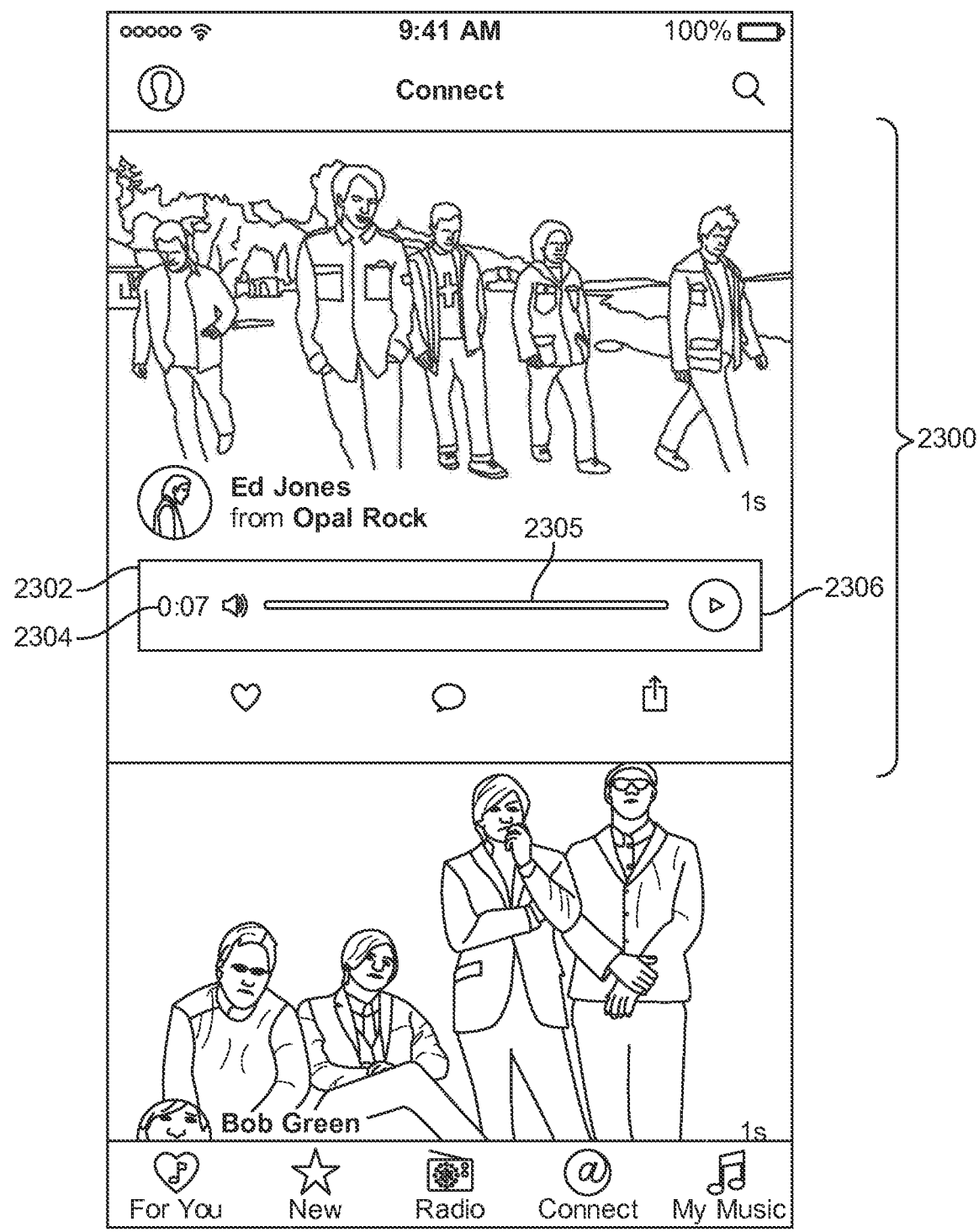

FIG. 23 shows an example of a post 2300 where the included content item is an audio clip (also referred to as a "sound bite"). An audio clip can be recorded by a posting user while composing a post, e.g., as described above with reference to FIGS. 9 and 10. When a post is rendered for a user, included content box 2302 can provide a user interface to play the audio clip. The interface can show, e.g., visual indicia 2304 that the included content item is an audio clip (in this example, a speaker symbol and a duration indicator), a playback progress bar 2305, and a play control 2306 that the user can select to play the clip. While the user is playing the clip, included content box 2302 can be modified to reflect that the clip is playing. For example playback progress bar 2305 can be gradually "filled in" with a contrasting color as the clip is played. As another example, an animated wave form generated from the audio data can be rendered in time with the clip. Other visual indicators of playing a clip can also be used.

Figure 24:
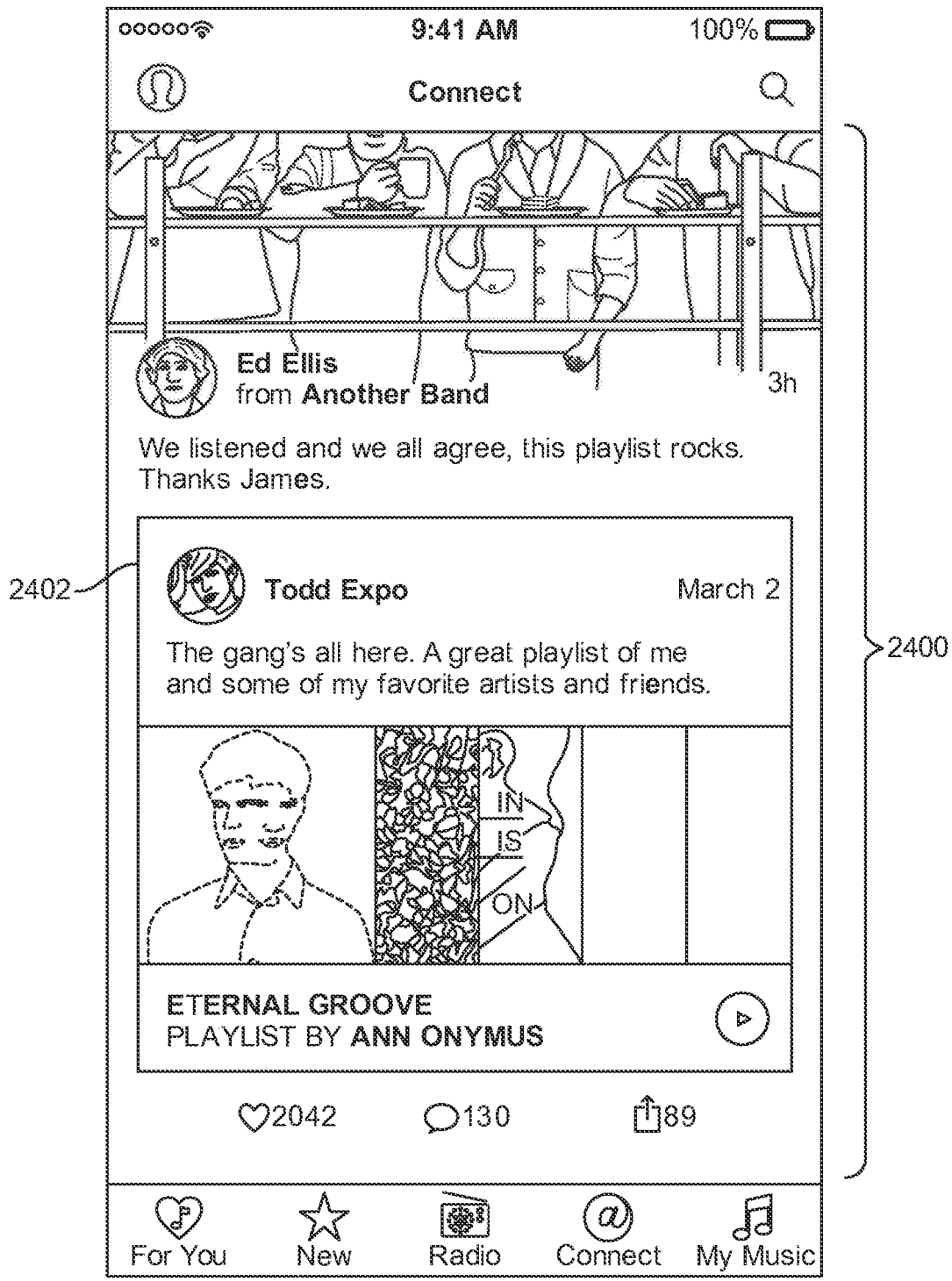

FIG. 24 shows an example of a post 2400 where the included content item is a reshared post. The reshared post in this example corresponds to post 1900 of FIG. 19. As shown, included content box 2402 can include a reduced rendering of the reshared post; for example, band image 1900 can be removed, while other elements of the reshared post can be retained. The background color for included content box 2402 can be based on the background color for post 2400 or the background color for post 1900 as desired. In some embodiments, any user with posting privileges can reshare any post by any other user. In other embodiments, resharing can be limited (e.g., to certain post types).

It is contemplated that posts of the various types illustrated (and/or other types) can be collected in a feed, e.g., a chronologically-ordered scrollable listing, and a user can scroll through the feed to read posts and sample any included content items as desired. In some instances, certain artists may become frequent posters, and it may be desirable to avoid having frequently-posting artists visually dominate a user's feed. Accordingly, in some embodiments, multiple posts from the same artist can be consolidated into a single post, e.g., for presentation in a feed.

Figure 25:
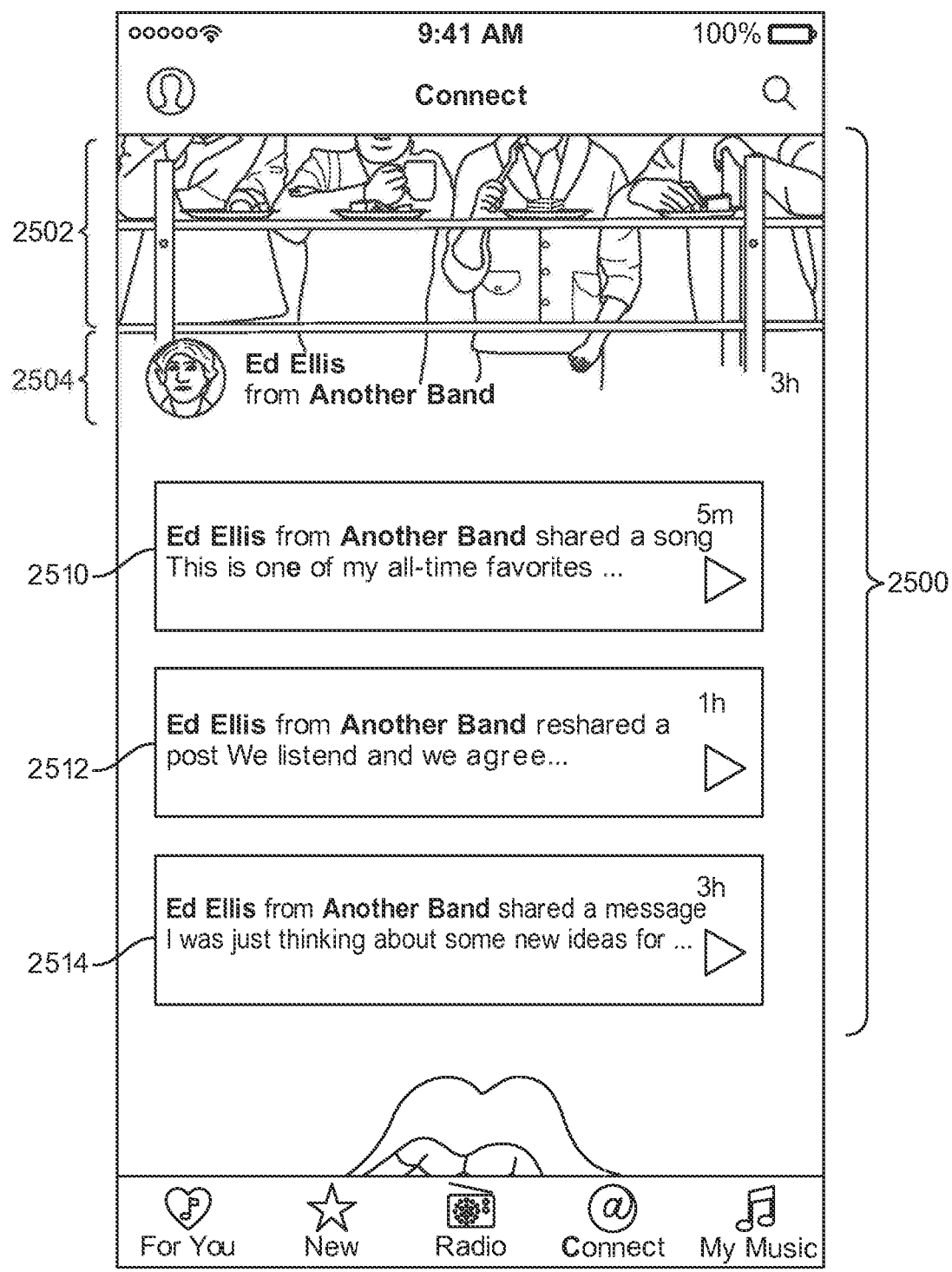

FIG. 25 shows an example of a consolidated post 2500. In this example, a band image 2502 (part of which is scrolled offscreen) and author identifier 2504 can be generated as described above. Instead of text and an included content item box as in the examples above, consolidated post 2500 can include preview boxes 2510, 2512, 2514, each of which represents a different post. Each preview box 2510, 2512, 2514 can identify the post type (e.g., based on the type of included content item, such as song, sound bite, message, etc.) and include a preview portion of the accompanying text (e.g., the first few words of the post text). Each preview box 2510, 2512, 2514 can also include a timestamp for the corresponding post. Each preview box 2510, 2512, 2514 can include (or be) an active interface element that the user can tap to view the entire post, including any included content items. For example, if the user selects preview box 2510, preview box 2510 can expand into a post view of the kind shown in FIG. 20 (sharing an uploaded song).

These and other types of posts can be included in a feed as described above. A user can access a feed at any time, e.g., by selecting "connect" element 210 as shown in FIG. 2. In some embodiments, "connect" element 210 can include a badge or other visual indicator (e.g., color change) to inform the user when the feed includes posts the user has not yet viewed. The badge can include, e.g., a number superimposed on a corner of "connect" element 210, a glyph such as an asterisk, or any other visual cue. In some embodiments, posts can also be surfaced in other contexts, regardless of post type.

Figure 26:
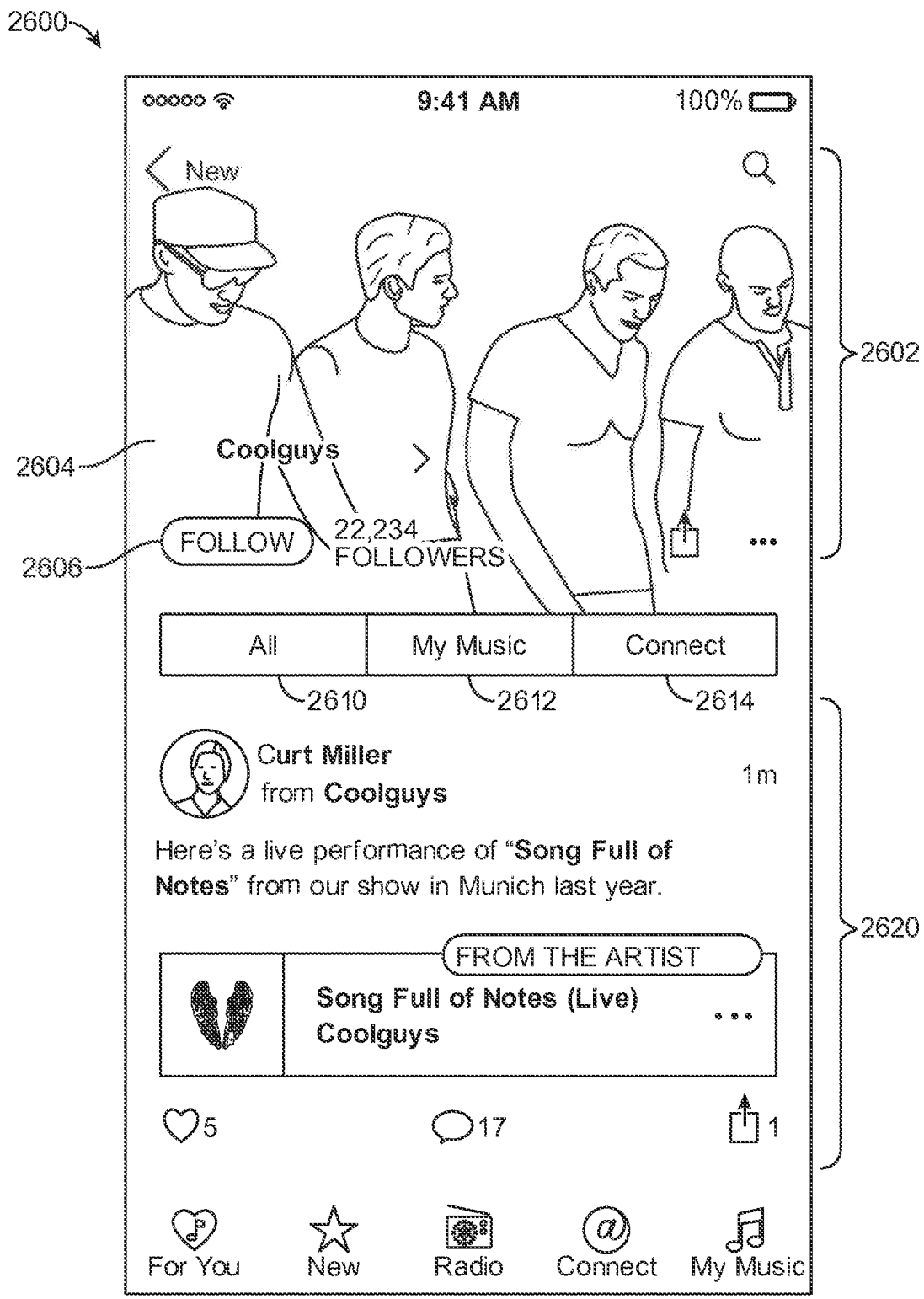
FIG. 26 shows an example of surfacing a post on an artist page according to an embodiment of the present invention.

FIG. 26 shows an example of surfacing a post on an artist page according to an embodiment of the present invention. An artist page 2600 can include a collection of information about a particular artist whose work is represented in catalog repository 110. In some embodiments, an artist page can be generated algorithmically for any artist (individual or band) to whom is attributed at least one content item in catalog 110. Artist page 2600 can feature a band image 2602 for the artist (this can be the same band image that is used for rendering posts, as described above), and a color scheme for artist page 2600 can be algorithmically generated from band image 2602. This can have the effect that an artist page for an artist and posts by the artist in the user's feed have a similar look, which the user may come to associate with the artist. (An artist may also be able to attract attention by changing their band image, thereby changing the look of both their feed posts and their artist page.) Band image 2602, or a portion thereof, can be overlaid with the band name 2604. In some embodiments, band name 2604 can be an active interface element that the user can select to learn more about the band. For instance, a user may be able to access a history of the band, description of the band, information about individual band members, and so on.

"Follow" button 2606 can be presented if the user is not currently following the artist; if the user is following the artist, "Follow" button 2606 can be replaced with a "Following" badge (which in some instances can be selectable by the user to obtain an option to cease following the artist). Other information and control options can also be provide.

Artist page 2600 can include various user-selectable "tabs" to allow the user to view different information about the artist. For instance, "All" tab 2610 can be selected to view a listing of catalog content items by the artist, and "My Music" tab 2612 can be selected to view a listing of content items by the artist that the user has indicated interest in (e.g., by bookmarking, downloading, and/or purchasing).

In the example shown, "Connect" tab 2614 has been selected, and the information presented can include a listing of posts by the artist. An example post 2620 is shown. It is to be understood that page 2600 can be scrollable, allowing the user to view additional posts. Post 2620 can be rendered similarly to other posts described above, except that in this example, the band image is not included in post 2620 (it is already present at the top of the page).

In some embodiments, the listing of posts under "Connect" tab 2614 can be made available whenever a user visits an artist page, regardless of whether the user is following the artist. "Connect" tab 2614 can include a badge or other visual indicator (e.g., color change) to inform the user when the listing includes one or more posts the user has not yet viewed; the badge can be visible regardless of whether the user is viewing content under "Connect" tab 2614, "All" tab 2610, or "My Music" tab 2612. The badge can include, e.g., a number superimposed on a corner of "connect" tab 2614, a glyph such as an asterisk, or any other visual cue. "Connect" tab 2614 can be presented to all users, or just to subscribers as desired. In addition, as with other examples described above, the ability of non-subscribers to interact with post 2620 can be limited. For instance, non-subscribers might be permitted to view post 2620 but not to listen to the uploaded song.

In some embodiments, uploaded content items from an artist may be available only by accessing a post in which it was uploaded. In other embodiments, uploaded content items can be collected on the artist's page. For example, "All" tab 2610 can have sections for the artist's catalog songs, catalog albums, and catalog videos. One or more additional sections can be provided to present the artist's uploaded content items (e.g., photos, videos, and songs); the uploaded content items can be organized as desired and visually distinguished from catalog items.

In addition to or instead of surfacing posts on an artist page, posts can also be surfaced on an album page. For example, as described above, a posting artist can have the option to attach a post to an album. When a user visits the album page for a particular album, any posts that have been attached to the album can be surfaced, along with other information about the album.

Figure 27:
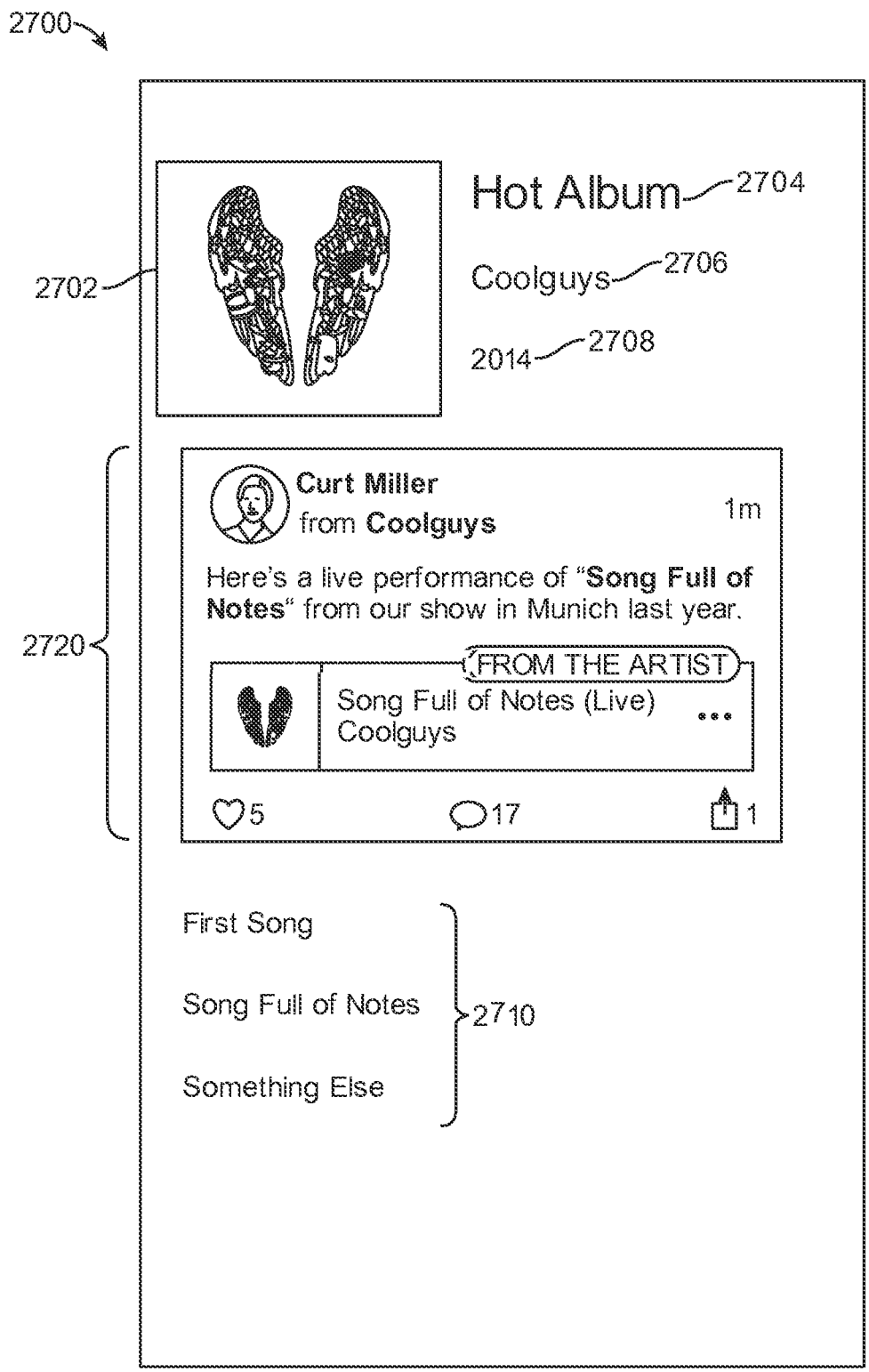
FIG. 27 shows an example of surfacing a post on an album page according to an embodiment of the present invention.

FIG. 27 shows an example of surfacing a post on an album page according to an embodiment of the present invention. An album page 2700 can include album-identifying information such as cover art 2702, album name 2704, artist name 2706, and release date 2708. Album page 2700 can also include a track listing 2710 with an entry for each track in the album. The entries in track listing 2710 can include track title and duration, and each entry can be an active interface element that the user can select to play the track or to obtain other options (e.g., bookmarking, downloading, or purchasing the track). In some embodiments, the user may also be able to operate controls (e.g., selecting the album name or artwork) to play the entire album, bookmark the album, download the album, or purchase the album.

In this example, it is assumed that the artist has attached post 2720 to the album represented by album page 2700 (e.g., using a screen similar to screen 600 of FIG. 6). Accordingly, post 2720 can be rendered as part of album page 2700. In this example, post 2700 can be rendered similarly to other examples described above, except that a band image is not provided. The band image can be at the top of album page 2700 (not shown) or omitted entirely. The color scheme for post 2720 can be based on the album page or the band image as desired.

In the example shown, post 2720 is placed between the general album information and track listing 2710. Other arrangements are also possible. For instance a tabbed arrangement can be used, with one tab providing a track listing, a second tab providing a listing of attached posts (if any), and a third tab providing reviews and/or other commentary on the album. More or fewer tabs can be provided as desired. For instance, in embodiments where any user can create posts, a separate tab may be provided for users to post about the album; use of separate tabs can allow user posts to be visually segregated from artist's posts.

In some embodiments, it may be desirable to surface posts to a user who is consuming media, e.g., media streamed by streaming media server 102 or media locally stored on user device 106 and played using media app 120.

Figure 28:
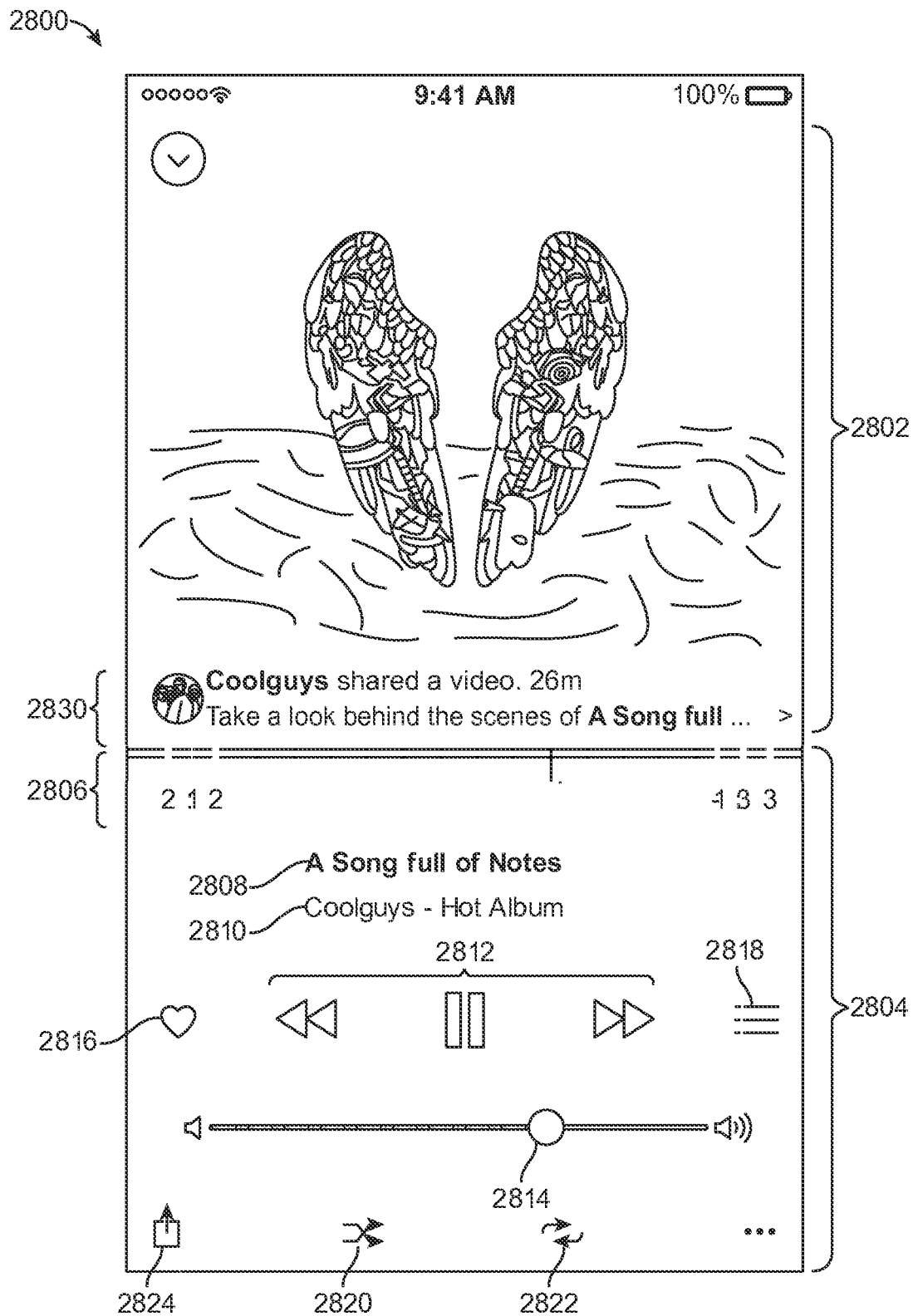
FIG. 28 shows an example of surfacing a post on a "now playing" screen according to an embodiment of the present invention.

FIG. 28 shows an example of surfacing a post on a "now playing" screen 2800 according to an embodiment of the present invention. "Now Playing" screen 2800 can be presented, e.g., while a user is listening to media content using media app 120. Screen 2800 can include an image 2802 (e.g., artwork associated with the content item being played or with an album that includes the content item being played) and a control section 2804. Control section 2804 can allow the user to see the playback progress (via progress indicator 2806), title of the content item 2808, and artist name 2810. Control section 2804 can also include playback controls 2812 and volume control 2814. Other controls can allow the user to uprate the content item (button 2816), visit a "playlist" page (via button 2818) that shows upcoming and/or previously played content items, shuffle the content items in the playlist (button 2820), control repeat options (button 2822), share the content item or information about the content item (button 2824), and so on.

In some embodiments of the present invention, a post associated with the artist (individual or band) who created the content item being played can be surfaced on screen 2800. For instance, post preview 2830 for a post by the artist can be presented. Post preview 2830 can identify the type of included content item ("video" in this example) and a preview portion of the accompanying text (e.g., the first few words of the post text). Post preview 2830 can include (or be) an active interface element that the user can tap to view the entire post, including any included content items. For example, if the user selects post preview 2830, post preview 2830 can expand into a post view of the kind shown in FIG. 21 (sharing an uploaded video). In some embodiments, only the most recently posted post by the artist is surfaced on screen 2800.

Surfacing of posts on Now Playing screen 2800 can be subject to various conditions. For example, a post might not be surfaced if the artist does not have any recent postings (for this purpose, "recent" can be defined as within the last 30 days or some other time period as desired). A post might not be surfaced if the user has already seen it. In some embodiments, posts are surfaced on Now Playing screen 2800 only if the user is following the artist. A user can have the option (e.g., as an account setting) to enable or disable surfacing of posts on Now Playing screen 2800 or to specify conditions under which posts should be surfaced on Now Playing screen 2800.

In some embodiments, a post can be surfaced on a "lock screen" of a user device. The lock screen can be displayed when the device is in a locked state (e.g., after a period of user inactivity or in response to user input locking the device). If the device enters the locked state while a content item is playing, the lock screen can include an image associated with the content item, e.g., similar to image 2802. A post can be surfaced in a manner similar to post preview 2830, although in this case the user may be prompted to unlock the device prior to viewing the post.

In various embodiments, users can have other options related to when and how posts can be surfaced. For instance, in the examples described above, posts are surfaced based on a particular user action (e.g. viewing a feed, navigating to an artist or album page, playing content). In some cases, a user may want to receive notifications of new posts without having to look for them. Accordingly, some embodiments can provide an option (e.g., an account setting) that allows the user to subscribe to notifications for posts by some or all of the artists the user is following. The user may also be able to subscribe to notifications for other artist-related events, such as the release of a new album. Notifications can be delivered to a user's device(s), e.g., using push notification capabilities or the like.

As another example, users may have the option to comment on posts (e.g., by selecting comment button 264 in FIG. 2), and users or artists may be able to reply to comments by others. In some embodiments, a user can opt in to receive a notification if an artist (or anyone) replies to a user's comment on a post. The option can be per-post, per-artist, or a global option as desired.

Users may also have options to sort and filter their feeds. For example, in some embodiments, the user can choose to have the feed sorted either chronologically (e.g., most recent first) or based on a "relevance" algorithm. The relevance algorithm can be any algorithm that takes user behavioral data as an input and generates an output score indicating likelihood of the user being interested in a particular post. For instance, posts by artists whose music the user listens to most often may be given higher relevance scores than posts by other artists. The relevance score can incorporate recency of posts as well as a user's history of interactions with content items and/or posts by a particular artist and/or posts of a particular type. For instance, if a user never plays uploaded videos, it can be inferred that posts containing uploaded videos are of low relevance to that user.

In addition, a user can filter the feed by specifying various filter criteria. Filtering can be based on age of the post (e.g., only show posts within the last two weeks, last month, or some other time period), included content type (e.g., only show posts that include uploaded songs, or do not show posts that include uploaded photos), or other criteria. One filtering criterion can be based on the "explicit" flag described above, and each user can choose whether to include or exclude explicit posts when surfacing posts in the feed and/or elsewhere. In some instances, users may also have the option to block catalog content items flagged as explicit, and this setting can be applied to social posts as well. Some embodiments may also allow an account to be identified as a "child" account, indicating that the user is under an age limit set by the service provider (e.g., under 13 or under 18), and child accounts may be automatically blocked from receiving explicit content, including posts flagged as explicit. Explicit content can also be blocked based on region (e.g., blocking explicit content in countries where such content is illegal). In some embodiments, filtering of the feed may be performed automatically based on legal considerations or the like. For instance, certain countries may impose restrictions on the distribution of information, and the provider of the streaming media service may apply regionally-based filters to facilitate compliance with such restrictions. In one example, the streaming media service may maintain a "whitelist" of posts (or artists) that have been approved for distribution in a particular country, and the feed for users in that country can be filtered to include only whitelisted posts (or posts by whitelisted artists). As another example, explicit posts may be automatically removed from the feed by a filter applied in countries where distribution of explicit content is illegal.

Those skilled in the art will appreciate that the post formats and options for surfacing posts described above are examples and that other techniques and formats for surfacing and presenting posts can also be implemented. In some embodiments, media app 120 or streaming media server 102 can optimize rendered post formats based on the properties of a particular display device on which the post is being presented, so the same post may look different on different devices.

Following Artists

As noted above, a user can select artists to follow. For instance, as shown in FIG. 26, a user can opt in to following an artist while visiting an artist page for the artist. In some embodiments, streaming media server 102 can actively assist listeners in finding artists to follow.

Figure 29:
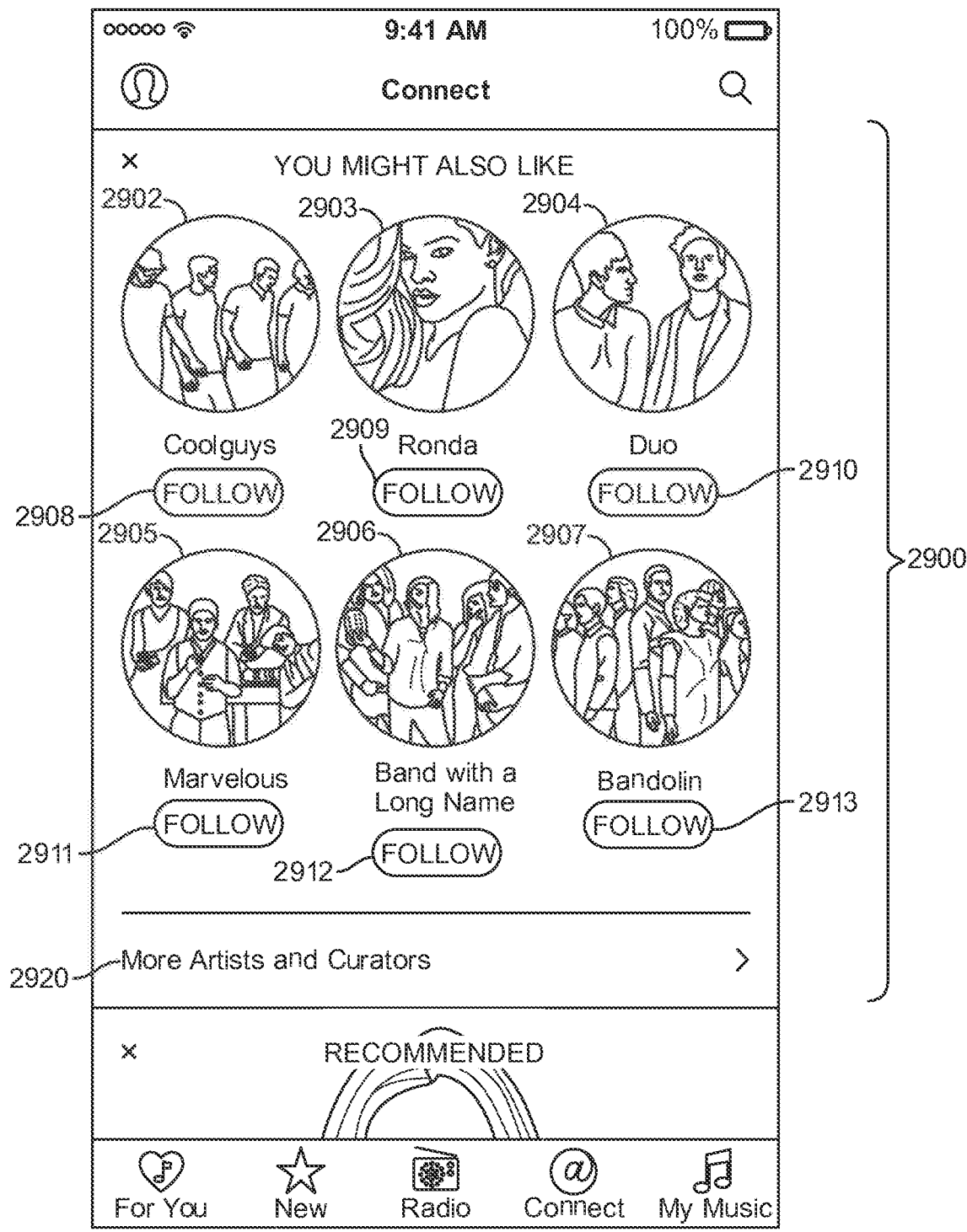
FIG. 29 shows an example of a recommendation entry that can be included in a social feed according to an embodiment of the present invention.

For example, in some embodiments, streaming media server 102 can generate recommendations for a user and present the recommendations in the user's social feed. FIG. 29 shows an example of a recommendation entry 2900 that can be included in a social feed according to an embodiment of the present invention. Recommendation entry 2900 can show band images and/or names of various artists 2902-207 and cab include a follow button 2908-2913 for each artist. A user can select band image 2902 to visit the corresponding artist page or select follow button 2908 to begin following the corresponding artist, and so on. Control element 2920 can be selected to explore additional recommendations.

Recommendations can be generated using a computer-implemented recommendation algorithm that can aggregate various users' history of listening to, downloading, and/or purchasing content items by various artists as well as behavior related to following particular artists and/or interacting with posts by particular artists. Pattern detection algorithms can be applied to identify correlations in aggregate user behavior (e.g., users who follow artist A also tend to follow artist B). Based on detected correlations and a particular user's history, the recommendation algorithm can generate recommendations specific to the particular user. A variety of different algorithms, including known algorithms, can be used.

Figure 30:
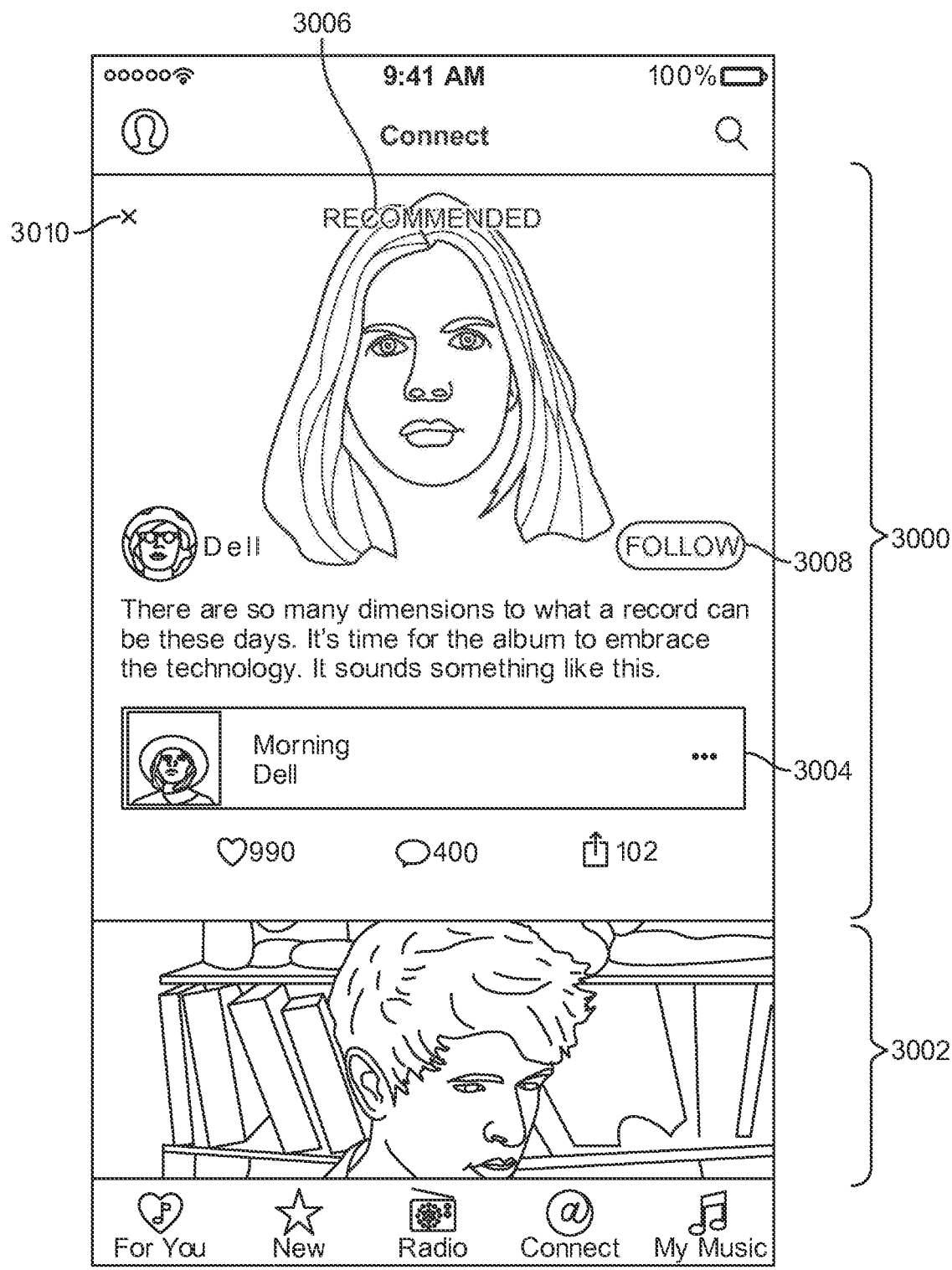
FIG. 30 shows an example of a post by a recommended artist according to an embodiment of the present invention.

Another option for presenting recommendations to a user can include presenting, in the user's feed, a post by a recommended artist. Recommended artists can be identified, e.g., using recommendation algorithms as described above, and a recent post by a recommended artist can be inserted into the user's feed (e.g., in chronological order or near the end). FIG. 30 shows an example of a post 3000 by a recommended artist according to an embodiment of the present invention. Post 3000 can be included in a user's feed along with posts by artists the user is following, such as post 3002 that is partially visible at the bottom of the screen. Post 3000 can be rendered similarly to other posts described above; in this example, included content item 3004 happens to be a catalog song by the posting artist. Unlike posts by artists the user is following, post 3000 can include "recommended" banner 3006, indicating that the post is being recommended to the user by the streaming media service, and "follow" button 3008 that the user can select to begin following the recommended artist. "X" control 3010 can be operated by the user to hide recommended post 3000 from the feed; in some embodiments, user operation of control 3010 can be taken as indicating the user's lack of interest in the artist in question, and this can influence subsequent recommendations.

In some embodiments, the number and frequency of recommendations can be varied as desired, e.g., based on the current level of activity in the user's feed. For a user who is already following multiple artists who are actively posting, recommendations might be rarely or never presented in the user's feed, while for a user who is following few or no artists, or artists who rarely or never post, recommendations can appear more frequently.

In some embodiments, in addition to or instead of recommending artists, a streaming media service can automatically set the user's account to follow certain artists. For example, when a new user signs up for the streaming media service, streaming media server 102 may be able to determine the content of a personal media library maintained for the user, e.g., by user device 106. Based on the content of the personal media library, streaming media server 102 can automatically set the user account to follow artists represented in the user's personal media library. As another example, based on a record of user behavior in relation to streaming, bookmarking, downloading, and/or purchasing media items, streaming media server 102 can automatically set a user account to follow one or more artists (e.g., artists whose content the user reliably chooses to listen to, bookmark, or purchase).

Users can also directly edit the list of artists they are following. For example, as shown in FIG. 2, control element 218 can allow the user to access account settings, which can include a list of artists the user is following. The user can edit the list, e.g., to add an artist or remove an artist. In some embodiments, the user can also control various settings related to automatic following (if automatic following is implemented), such as opting in or out of automatic following.

Another avenue for making recommendations for artist to follow can be based on activity charts related to posting by artists. For example, in some embodiments, a user may have an option (e.g., while viewing the feed) to access various activity charts. The activity charts can identify currently "popular" or "trending" posts by any artist, regardless of whether the user is following the artist. Popularity and/or trends can be measured using various statistics and metrics, such as the number of times a post has been uprated, number of comments, number of plays of an included content item, number of followers the artist has added in the last week, etc. In some embodiments, the numbers for a given artist's post can be normalized based on the amount of activity that artist's posts typically generate, so that a post that attracts an unusually high level of user response can be identified as popular, even if the artist is less well known than other artists. Activity information can be presented in lists, feeds of active posts, or graphical representations as desired, allowing the user to view popular or trending posts and decide whether to follow the artist.

Some embodiments may provide other options as well that do not require selecting a specific artist to follow. For instance, a user might choose to follow a genre, which can mean, e.g., following the top artists in the genre based on a popularity metric or other rating) or to follow a composer, which can mean, e.g., following artists who usually perform songs from that composer.

Expiration of Posts

In some embodiments, some or all posts can automatically expire. For example, an artist (or other user) who creates a post can specify an expiration date for the post (e.g., one month, three months, one week after posting). In addition or instead, the system can specify a default expiration date for posts (e.g., all posts expire after three months); where a default expiration date is specified, the artist can have the option to set an earlier date. Further, regardless of expiration policies, a posting user may have the option to remove a post manually at any time.

When a post expires (or is manually removed), the post and any uploaded content item included therein can become inaccessible to users. In some embodiments, expired posts need not be retained in social content repository 114. In other embodiments, expired posts and/or uploaded content items from expired posts can be retained in an "archive" maintained in social content repository 114 or in a separate repository. Posts in an archive can be omitted from feeds and not surfaced on artist pages, album pages, or elsewhere, but such posts can still be accessible to the artist and/or other users granted permission to access the archive. For example, users who are subscribers may be able to access archived posts and/or included content items while non-subscribers are excluded. In some embodiments, the posting artist can decide (e.g., on a per-post basis) whether an expired post should be archived or discarded.

By setting a post to expire, an artist can make free content available on a time-limited or otherwise restricted basis. For example, as described above, some embodiments can allow an uploaded song or video to be freely accessed by users of the streaming media service. If the posting artist (or the service) sets an expiration date, this can limit the period of free access. In some embodiments, expiration can be controlled based on the number of users accessing the content; for instance, a post that includes an uploaded song can expire after 10,000 users (or some other number, which can be selected by the artist) have listened to or downloaded it. Other expiration policies can also be supported.

Artist Feedback

Artists can receive feedback on their posts in various ways. For example, as noted above, users can uprate posts, comment on posts, share posts with others, and/or play (or download or otherwise access) included content items.

Other feedback mechanisms can be provided (for instance a 1-to-5 scale rating scheme can be used instead of uprating).

Artists can view their own posts (e.g., by navigating to their artist page) and see the response numbers in a manner similar to other users. Artists can also view and reply to any comments users may have made.

In some embodiments, artists may also be given access to additional metrics related to user responses to their posts. For example, artists may be able to see reports on user engagement with their social posts, e.g., the number of followers, trends over time, the number of impressions (how many times a post was surfaced), the number of different users responding (accounting for overlap between different forms of response), number of responders to a post who were first-time responders for that artist, number of times an included content item was played, and so on. The metrics can provide various demographic breakdowns (e.g., by user location, age, or the like), which can provide the artist some insight into where the fans are located and who they are. In some embodiments, streaming media service 102 can provide an "artist dashboard," either within media app 120 or in a separate application; the artist dashboard can allow artists to interact with and analyze collected metrics related to their posts as well as to their catalog content.

Computer Implementation

Figure 31:
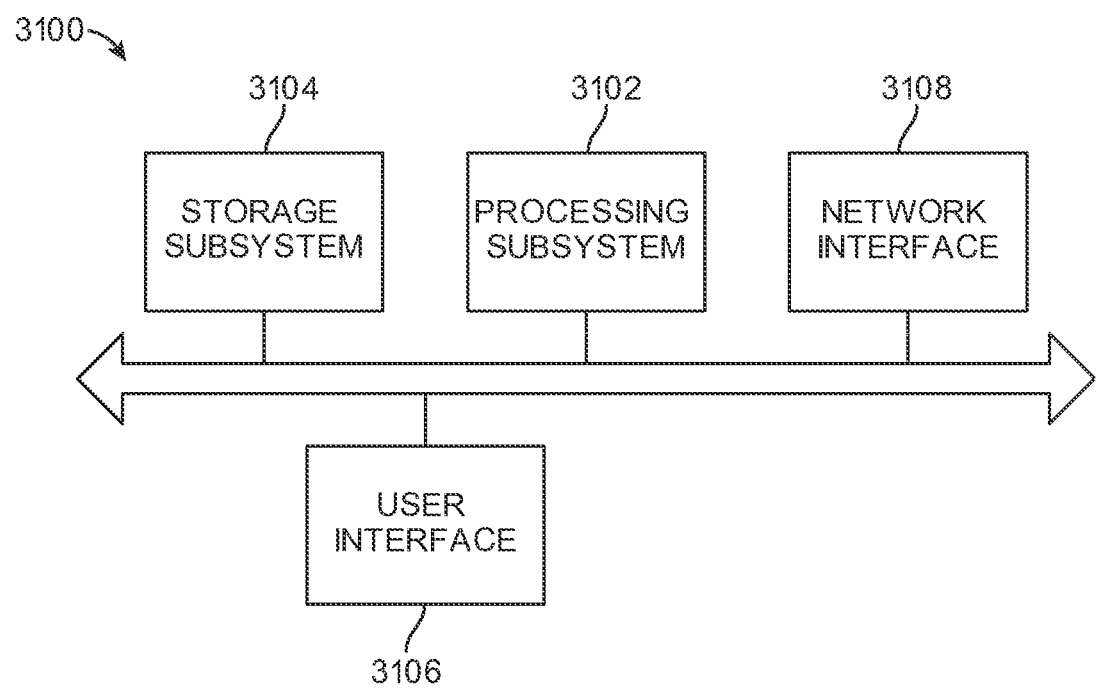
FIG. 31 is a simplified block diagram of a computer system according to an embodiment of the present invention.

FIG. 31 is a simplified block diagram of a computer system 3100 according to an embodiment of the present invention. In some embodiments, computer system 3100 can implement any or all of the functions, behaviors, and capabilities described herein as being performed by a user device or artist device (including user device 106 and artist device 108 of FIG. 1), as well as other functions, behaviors, and capabilities not expressly described. In some embodiments, another physical instance of computer system 3100 can implement any or all of the functions, behaviors, and capabilities described herein as being performed by a server (including streaming media server 102 of FIG. 1).

Computer system 3100 can include processing subsystem 3102, storage subsystem 3104, user interface 3106, and network interface 3108. Computer system 3100 can also include other components (not explicitly shown) such as a battery, power controllers, and other components operable to provide various enhanced capabilities. In some embodiments, computer system 3100 can be implemented in a consumer electronic device such as a desktop or laptop computer, tablet computer, smart phone, other mobile phone, wearable device, media device. household appliance, or the like. Computer system 3100 can also be implemented in a large-scale architecture such as a scalable server system or server farm that can include many interconnected processors, storage systems and interfaces, capable of processing and responding to high volumes of requests from client devices (including user devices and/or artist devices).

Storage subsystem 3104 can be implemented, e.g., using disk, flash memory, or any other non-transitory storage medium, or a combination of media, and can include volatile and/or non-volatile storage media. In some embodiments, storage subsystem 3104 can store one or more application and/or operating system programs to be executed by processing subsystem 3102, including programs to implement any or all operations described herein as being performed by a user device. For example, storage subsystem 3104 can store media app 120 of FIG. 1 and associated data (e.g., a local media library). In instances where computer system 3100 implements a server, storage subsystem 3104 can be implemented using network storage technologies and/or other technologies that can manage high-volume requests to large data stores. For example, storage subsystem 3104 can store and manage catalog repository 110, user account information repository 112, and social content repository 114. Depending on implementation, the various repositories can be physically or logically distinct.

User interface 3106 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). In some embodiments, a user can operate input devices of user interface 3106 to invoke the functionality of computer system 3100 and can view and/or hear output from computer system 3100 via output devices of user interface 3106. For example, all of the user interface screens described above can be rendered on a touchscreen display, and the user can provide input by touching appropriate areas of the touchscreen. Graphical user interfaces can also be rendered using a display screen and a pointing device (e.g., a mouse) that allows the user to control the position of an on-screen cursor; the user can position the cursor and press a button or tap a touch-sensitive surface to make a selection. In instances where computer system 3100 implements a server, user interface 3106 can be remotely located with respect to processing subsystem 3102 and/or storage subsystem 3104.

Processing subsystem 3102 can be implemented using one or more integrated circuits, e.g., one or more single-core or multi-core microprocessors or microcontrollers, examples of which are known in the art. In operation, processing subsystem 3102 can control the operation of computer system 3100. In various embodiments, processing subsystem 3102 can execute a variety of programs in response to program code and can maintain multiple concurrently executing programs or processes. At any given time, some or all of the program code to be executed can be resident in processing subsystem 3102 and/or in storage media such as storage subsystem 3104.

Through suitable programming, processing subsystem 3102 can provide various functionality for computer system 3100. For example, where computer system 3100 implements user device 106 or artist device 108, processing subsystem 3102 can implement various processes (or portions thereof) described above as being implemented by a user device or artist device. Processing subsystem 3102 can also execute other programs to control other functions of computer system 3100, including programs that may be stored in storage subsystem 3104. Where computer system 3100 implements streaming media server 102, processing subsystem 3102 can implement operations including streaming of content, generating page data for rendering various pages (including pages that contain social posts as descried above), performing searches within catalog repository 110 and/or social content repository 114 in response to received requests, and so on.

Network communication interface 3108 can provide voice and/or data communication capability for computer system 3100. In some embodiments, network communication interface 3108 can include radio frequency (RF) transceiver components for accessing wireless data networks (e.g., using data network technology such as 3G, 4G/LTE, IEEE 802.11 family standards (e.g., Wi-Fi network technology), or other mobile communication technologies, or any combination thereof), components for short-range wireless communication (e.g., using Bluetooth and/or Bluetooth LE standards, NFC, etc.), and/or other components. In some embodiments, network communication interface 3108 can provide wired network connectivity (e.g., Ethernet) in addition to or instead of a wireless interface. Network communication interface 3108 can be implemented using a combination of hardware (e.g., driver circuits, antennas, modulators/demodulators, encoders/decoders, and other analog and/or digital signal processing circuits) and software components. In some embodiments, network communication interface 3108 can support multiple communication channels concurrently, using the same transport or different transports.

It will be appreciated that computer system 3100 is illustrative and that variations and modifications are possible. User devices (including artist devices) implemented using computer system 3100 can be portable or non-portable as desired, and any number of user devices can communicate with a streaming media server. User devices and/or streaming media servers can have functionality not described herein (e.g., a user device may provide voice communication via cellular telephone networks; control mechanisms and/or interfaces for operating an appliance such as a thermostat or door lock; ability to interact with the user to provide personal information, play games, access content via the wireless network and/or locally stored content; etc.), and implementations of these devices and servers can include components appropriate to such functionality.

Further, while a computer system is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

While the invention has been described with respect to specific embodiments, one skilled in the art will recognize that numerous modifications are possible. For instance, many of the examples in the foregoing description refer to streaming of music. It is to be understood that social posting can also be used in conjunction with other types of media delivery services, such as services that provide access to movies, TV programs, games or other apps, books, and any other form of media content. Creators of content (or any other user who has been granted posting privileges) can generate and upload posts, and the service can surface the posts to users through a dedicated social feed page, in connection with viewing pages dedicated to particular artists or media content items (e.g., a post can be attached to a TV series), and/or during presentation of a media content item. A post can include any type of media content item, not limited to examples described above. For instance, in some embodiments, a posting user can upload and distribute an "ebook" (a media file that can be rendered with a page structure reminiscent of a printed book) as an included content item in a post. Users can download and read the ebook using reader software that is capable of rendering the pages. Posts can also include any type of catalog content item that might be available from a particular service, such as an ebook, a movie, a TV series or episode, an app, an item of merchandise, and so on.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
   at a streaming media server:
      receiving, from a source device, posting data including a content item, wherein the posting data indicates one or more expiration values including a threshold number of user devices;
      generating a post based on the posting data including the content item; and
      surfacing the post in order to render the post accessible to one or more user devices, wherein surfacing the post is based on a function of the one or more expiration values, including:
         in accordance with a determination that a number of user devices associated with accessing the content item exceeds the threshold number of user devices, ceasing surfacing the post; and
         in accordance with a determination that the number of user devices associated with accessing the content item does not exceed the threshold number of user devices, maintaining surfacing the post.

2. The method of claim 1, wherein the number of user devices associated with accessing the content item corresponds to the number of user devices associated with downloading the content item.

3. The method of claim 1, wherein the number of user devices associated with accessing the content item corresponds to the number of user devices associated with playing the content item.

4. The method of claim 1, wherein the streaming media server includes a social content repository, the method further comprising:
   storing the post in the social content repository; and
   removing the post from the social content repository in accordance with the determination that the number of user devices associated with accessing the content item exceeds the threshold number of user devices.

5. The method of claim 4, further comprising archiving the post in a separate repository in accordance with the determination that the number of user devices associated with accessing the content item exceeds the threshold number of user devices.

6. The method of claim 1, wherein the one or more expiration values include an expiration date, and wherein surfacing the post is based on a function of the expiration date.

7. The method of claim 6, wherein surfacing the post based on the function of the expiration date includes, in response to determining that a current date corresponds to the expiration date, ceasing surfacing the post.

8. The method of claim 7, wherein surfacing the post based on the function of the expiration date includes:
in accordance with a determination that the expiration date is earlier than a default expiration date, ceasing surfacing the post when the current date corresponds to the expiration date; and
in accordance with a determination that the expiration date is later than the default expiration date, ceasing surfacing the post when the current date corresponds to the default expiration date.

9. A streaming media server comprising:
a non-transitory storage medium;
a network interface; and
a processing subsystem coupled to the non-transitory storage medium and the network interface, the processing subsystem being configured to:
receive, from a source device via the network interface, posting data including a content item, wherein the posting data indicates one or more expiration values including a threshold number of user devices;
generate a post based on the posting data including the content item; and
surface the post in order to render the post accessible to one or more user devices, wherein surfacing the post is based on a function of the one or more expiration values, including:
in accordance with a determination that a number of user devices associated with accessing the content item exceeds the threshold number of user devices, cease surfacing the post; and
in accordance with a determination that the number of user devices associated with accessing the content item does not exceed the threshold number of user devices, maintain surfacing the post.

10. The streaming media server of claim 9, wherein the number of user devices associated with accessing the content item corresponds to the number of user devices associated with downloading the content item.

11. The streaming media server of claim 9, wherein the number of user devices associated with accessing the content item corresponds to the number of user devices associated with playing the content item.

12. The streaming media server of claim 9, wherein the streaming media server includes a social content repository, the processing subsystem being further configured to:
store the post in the social content repository; and
remove the post from the social content repository in accordance with the determination that the number of user devices associated with accessing the content item exceeds the threshold number of user devices.

13. The streaming media server of claim 12, the processing subsystem being further configured to archive the post in a separate repository in accordance with the determination that the number of user devices associated with accessing the content item exceeds the threshold number of user devices.

14. The streaming media server of claim 9, wherein the one or more expiration values include an expiration date, and wherein surfacing the post is based on a function of the expiration date.

15. The streaming media server of claim 14, wherein surfacing the post based on the function of the expiration date includes, in response to determining that a current date corresponds to the expiration date, ceasing surfacing the post.

16. The streaming media server of claim 15, wherein surfacing the post based on the function of the expiration date includes:
in accordance with a determination that the expiration date is earlier than a default expiration date, ceasing surfacing the post when the current date corresponds to the expiration date; and
in accordance with a determination that the expiration date is later than the default expiration date, ceasing surfacing the post when the current date corresponds to the default expiration date.

17. A non-transitory storage medium storing one or more programs, which, when executed by one or more processors of a streaming media server, cause the streaming media server to:
receive, from a source device, posting data including a content item, wherein the posting data indicates one or more expiration values including a threshold number of user devices;
generate a post based on the posting data including the content item; and
surface the post in order to render the post accessible to one or more user devices, wherein surfacing the post is based on a function of the one or more expiration values, including:
in accordance with a determination that a number of user devices associated with accessing the content item exceeds the threshold number of user devices, cease surfacing the post; and
in accordance with a determination that the number of user devices associated with accessing the content item does not exceed the threshold number of user devices, maintain surfacing the post.

18. The non-transitory storage medium of claim 17, wherein the one or more expiration values include an expiration date, and wherein surfacing the post is based on a function of the expiration date.

19. The non-transitory storage medium of claim 18, wherein surfacing the post based on the function of the expiration date includes, in response to determining that a current date corresponds to the expiration date, ceasing surfacing the post.

20. The non-transitory storage medium of claim 19, wherein surfacing the post based on the function of the expiration date includes:
in accordance with a determination that the expiration date is earlier than a default expiration date, ceasing surfacing the post when the current date corresponds to the expiration date; and
in accordance with a determination that the expiration date is later than the default expiration date, ceasing surfacing the post when the current date corresponds to the default expiration date.

* * * * *